(12) United States Patent
Young et al.

(10) Patent No.: US 6,324,405 B1
(45) Date of Patent: Nov. 27, 2001

(54) COMMUNICATIONS APPARATUS AND METHOD FOR MOBILE PLATFORMS HAVING A PLURALITY OF USERS

(75) Inventors: Eddy Ka Ping Young, Kingston-Upon-Thames; Sze-Ching Lu, Surrey, both of (GB)

(73) Assignee: ICO Services Ltd., London (GB)

(*) Notice: Subject to any disclaimer, the term of this patent is extended or adjusted under 35 U.S.C. 154(b) by 0 days.

(21) Appl. No.: 08/926,073

(22) Filed: Sep. 9, 1997

(30) Foreign Application Priority Data

Sep. 9, 1996 (GB) .................................................. 9618738

(51) Int. Cl.$^7$ ........................................................ H04Q 7/20
(52) U.S. Cl. .................... 455/456; 455/12.1; 455/427; 455/431; 455/558
(58) Field of Search .................................. 455/427–428, 455/430, 12.1, 13.1, 550, 552, 557–558, 426, 431, 456, 572

(56) References Cited

U.S. PATENT DOCUMENTS

| | | | |
|---|---|---|---|
| 4,117,267 | * | 9/1978 | Haberle et al. .................. 455/13.2 X |
| 4,189,675 | | 2/1980 | Reilly et al. . |
| 4,399,930 | | 8/1983 | Harding . |
| 4,903,298 | * | 2/1990 | Cline ................................ 455/431 X |
| 5,438,610 | | 8/1995 | Bhagat et al. . |
| 5,455,964 | * | 10/1995 | Roos et al. ........................ 455/431 X |
| 5,490,087 | * | 2/1996 | Redden et al. ......................... 455/427 |
| 5,557,656 | * | 9/1996 | Ray et al. ............................ 455/431 |
| 5,559,865 | * | 9/1996 | Gilhousen ........................... 455/431 |
| 5,628,049 | * | 5/1997 | Suemitsu ............................ 455/11.1 |
| 5,651,050 | * | 7/1997 | Bhagat et al. ....................... 455/431 |
| 5,878,034 | * | 3/1999 | Hershey et al. ..................... 370/321 |
| 5,884,166 | * | 3/1999 | Ray et al. ............................ 455/431 |
| 5,884,168 | * | 3/1999 | Kolev et al. ......................... 455/432 |
| 5,956,639 | * | 9/1999 | Armbruster et al. ................. 455/431 |

FOREIGN PATENT DOCUMENTS

| | | |
|---|---|---|
| 0568778 | 2/1993 | (EP) . |
| 0562374 | 3/1993 | (EP) . |
| 2295296 | 5/1996 | (GB) . |
| WO 94/28684 | 12/1994 | (WO) . |
| WO95/12853 | 5/1995 | (WO) . |
| WO 96/02093 | 1/1996 | (WO) . |
| WO 96/16488 | 5/1996 | (WO) . |

OTHER PUBLICATIONS

Pettifor, J. D.et al, "An overview of Aeronautical Telecommunications in Europe and World Wide," BT Technololgy Journal, vol. 14, No. 3, Jul. 1996, pp. 64–73.

Peter C.J. van der Arend, "security Aspects and the Implementation in the GSM–System", Digital Cellular Radio Conference (DCRC) Conference Proceedings, Oct. 12–14, 1988, published by Deutsche Bundespost, France Telecom and FernUniversitate, pp. 4a/1–4a/6.

Araki et al., Proceedings of The Third International Mobile Satellite Conference IMSC 1993 (JPL publication 93–009), pp. 529–534, published by Jet Propulsion Laboratories (1993).

* cited by examiner

Primary Examiner—Nay Maung
(74) Attorney, Agent, or Firm—McDermott, Will & Emery

(57) ABSTRACT

A multi user communications terminal apparatus providing simultaneous access for a plurality of users to a communications network in which the geographical locations of each user are registered and periodically updated, the terminal apparatus comprising a plurality of user terminals (320) each including electroacoustic transducers (34, 36); and a common RF unit (304) comprising a shared RF amplifier (342) for coupling to a shared antenna system (302), in which the terminal apparatus comprises means (348) for transmitting common location updating signals, and is arranged not to transmit separate location update signals for every one of said users.

14 Claims, 16 Drawing Sheets

| ID # | STATUS | ACTIVE NODE | AVAIL ? | HOME |
|---|---|---|---|---|
| 00001 | LOCAL | 6a | Y | 8a |
| | | | | |
| | | | | |

FIG. 6a

| ID # | STATUS | POSITION | SAT. | BEAM | AVAIL ? | HOME |
|---|---|---|---|---|---|---|
| 00001 | LOCAL | 46°, 35° | 4a | 101 | Y | 8a |
| | | | | | | |
| | | | | | | |

FIG. 6b

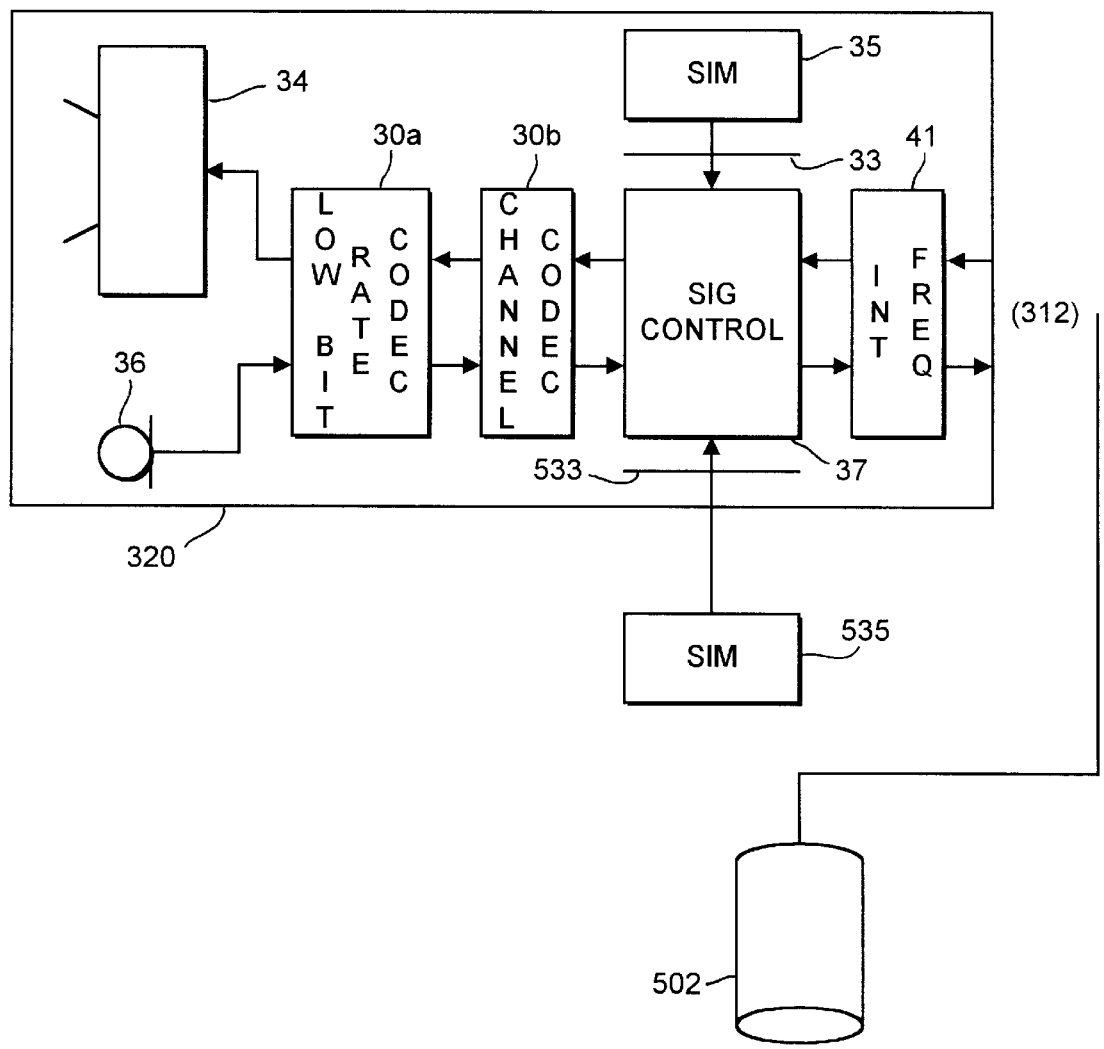

US 6,324,405 B1

COMMUNICATIONS APPARATUS AND METHOD FOR MOBILE PLATFORMS HAVING A PLURALITY OF USERS

FIELD OF THE INVENTION

This invention relates to communications with a mobile user, and in particular to such communications in which the link to the mobile user is via a satellite or satellites.

This invention is particularly concerned with communications to mobile platforms carrying a number of potential subscribers or users; examples of such platforms are aircraft, ships or long range buses.

BACKGROUND ART

U.S. Pat. No. 4,189,675 proposes a satellite communications method and apparatus for communicating with mobile users using a satellite in a predetermined orbit.

EP 0562374 and EP 0568778 are believed to describe the "Iridium" proposed satellite cellular mobile communication system.

An alternative proposed satellite cellular system is described in EP 0536921 and EP 0506255.

GB-A-2295296 and WO-A-96/16488 describe a satellite communications network and in particular the ground segment thereof.

Communications to and from moving platforms such as aircraft or ships have traditionally been either ground based or satellite based.

One description of a satellite based system is given in "An airline passenger telephone system design development and early trials"; J. G. Schoenenberger and R. A. McKinlay, Fourth International Conference on Satellite Systems for Mobile Communications and Navigation, Oct. 17–19, 1988, pages 97–101, published by IEE.

In the system discussed, an aircraft carries equipment to allow two voice channels to carry passenger telephone conversations via a satellite to one or a number of ground stations. Four telephone handsets are provided in the aeroplane, and are assignable to the two channels.

U.S. Pat. Nos. 5,408,515 and 5,438,610 describe a satellite based system in which aircraft are equipped with a number of phones for use by customers. The customers register their seat numbers on check in, so that it is known which customer sits at which seat. Ground stations along the likely route to be taken by the aircraft are paged by the network on receipt of an incoming call by a party who knows on which aircraft and in which seat the customer is sitting, and when the page is successfully answered by the aeroplane, a call back is set up.

Dedicated ground to air systems are known which do not involve satellites, generally via dedicated HF ground stations. These systems, however, only give partial coverage over land and little coverage at sea.

U.S. Pat. No 4,399,330 discloses a communications system for a train, in which the train carries a number of telephones (one per compartment) and a mobile terminal concentrator device which communicates with the subscriber terminals and with a ground based radio connection station. The subscribers insert "smart cards" carrying ID codes or other data, and data indicating their presence or absence on the train is transmitted to the radio station.

Various terrestrial digital cellular communications systems are known or proposed. Of these, the GSM system is widely known.

In the GSM system, as in other cellular systems, in order to be able to direct incoming calls to a user, it is necessary to be aware of the location of the user (so called "mobility management"). In GSM, this is achieved by the provision of two layers of databases; so called "home location registers" (HLRs), and so called "visiting location registers" (VLRs), and by registration and location updating signalling processes.

Subscriber data on a given user and/or user terminal is stored in a specific HLR for that user. Each mobile switching centre (MSC) associated with a particular geographical area has an associated VLR, in which are temporarily stored details necessary for call management of all users currently thought to be within the area of that MSC.

Initially, a mobile terminal scans the broadcast common control channels (BCCHs) originating from all base stations (BSCs) within its reception, and attempts to register with one. The registration takes the form of an exchange of validation data, as described in "Security aspects and the implementation in the GSM-system", Peter C. J. van der Arend, page 4a, Digital Cellular Radio Conference (DCRC) Conference Proceedings, Oct. 12–14, 1998, published by Deutche Bundespost, France Telecom and FernUniversitate.

If the data match, the mobile terminal is registered as being within the area of the VLR and MSC. On registration, the identity of the VLR is stored in the HLR for the mobile terminal.

Subsequently, when incoming calls arrive for the mobile terminal, the HLR is accessed to determine the VLR where the mobile is registered and calls are then routed to the MSC associated with that VLR.

Even in idle or "sleep" mode, mobile terminals will continually or periodically scan the broadcast control channels (BCCHs) which they can receive. Each BCCH of a cell carries, amongst other data, a location area identifier (LAI) indicating an individual cell or a group of cells within a certain area. When a new location area indicator is detected (indicating that the mobile terminal has moved into a new area), the mobile terminal transmits a location update request indicating the new LAI.

The exchange of authentication data is repeated, and if the mobile terminal is authenticated the new location area indicator is written into the VLR.

Thus, the VLR continually maintains an indication of which area (and, more specifically, which cell) the mobile terminal is within.

A mobile terminal may also move between the areas of two different VLRs.

In the GSM system, there is also a signalling procedure to secure periodic registration from mobile stations, to maintain information on the status of mobile stations.

Similar issues will arise in relation to satellite communications systems; see, for example, the paper "Study on network issues of medium earth orbit satellite communications systems"; Araki et al, Proceedings of the Third International Mobile Satellite Conference IMSC 1993 (JPL publication 93-009),pages 529–534, published by Jet Propulsion Laboratories (1993). In that paper it is described how either each land earth station may issue a location area identifier signal which is carried by spot beams of satellites within the area, or each spot beam of each satellite may carry a location area identifier.

Various attempts have previously been made to integrate cellular telephony and calls to aircraft. Naturally, mobile telephone users wish to use their telephones on board moving platforms such as a aircraft, but this leads to a number of problems.

Firstly, there may be interference with on board navigation systems or other equipment.

Secondly, there may be interference between aircraft systems and other systems through the coverage regions of which the aircraft is flying.

Thirdly, due to the relatively high speed with which the customer may be moving, terrestrial systems may be insufficient to cope with the number of handovers and the sudden transient loads as the moving platform passes through their coverage region.

U.S. Pat. No 5,444,762 discloses a system in which an aircraft monitors terrestrial channels and makes use of unused channels.

One approach is to provide a local cellular base station and switching centre on board the vehicle, to treat the vehicle as a microcell. Thus, the aircraft itself can deal with all signalling to and from the cellular telephones to handle location updating.

For example, "The provision of GSM cellular radio environments within passenger aircraft operating over Europe", I. Casewell, Fifth International Conference on Mobile, Radio and Personal Communications (Dec. 11–14, 1989) pages 57–67 published by IEE, discloses a system in which an aircraft has a transponder which includes a first air interface for communicating with mobile telephones on board, and a second air interface for communicating with terrestrial base stations.

WO 94/28684 suggests providing an aircraft with a GSM station including both a base station and a mobile switching centre, linked to terrestrial networks by a dedicated HF network. The user terminals in this case are conventional cellular handsets coupled via their external antenna sockets to connecting wires.

AU 9477530 suggests a dual mode handset which can either operate as a traditional RF handset, or through an infrared optical link when on board a vehicle such as a plane, which has a base station with an infrared interface.

Several of the above described systems are unsatisfactory in various ways. Those systems which make use of RF communications within the vehicle are not preferred because of the possibility of interference with vehicle electronic systems. On the other hand, separate systems providing non-cellular communications facilities inevitably require separate payment, and make it difficult or impossible to receive incoming calls.

Finally, the provision of base station and mobile switching centre equipment on board a vehicle for what may be a relatively small number of users is unnecessarily expensive.

The present invention, in various embodiments, is directed to alleviating one or more of the above problems.

According to one aspect, the present invention provides a multi user communications terminal apparatus providing simultaneous access for a plurality of users to a communications network in which the geographical locations of each user are registered and periodically updated, the terminal apparatus comprising a plurality of user terminals each including electroacoustic transducers; and a common RF unit comprising a shared RF amplifier for coupling to a shared antenna system, in which the terminal apparatus comprises means for transmitting common location updating signals, and is arranged not to transmit separate location update signals for every one of said users.

In another aspect, the invention provides a method of communication from a multi user terminal comprising the step of sending common location updating messages to jointly update the positions of a plurality of users of said terminal.

In another aspect, the present invention provides a method of mobility management in a mobile communications system for a plurality of mobile users, comprising updating position data for a plurality of mobile users of a multi user mobile terminal on the basis of common updating messages for said users.

In another aspect, the invention provides mobility management apparatus in a mobile communications network, for registering and periodically updating geographical locations of a plurality of users of said network, the apparatus being arranged to update the geographical locations of a plurality of users of a multi user communications terminal apparatus in dependence upon a smaller number of location updating messages received from the multi user communications terminal apparatus.

In these aspects, a considerable reduction in the volume of signalling traffic is achieved, since it is not necessary continually to update the positions of all users on board the terminal; it is preferably not even necessary to update the positions of as many users as can be allowed simultaneously to communicate via the terminal. Preferably, only a single location updating message for all the users is transmitted.

At the same time, location updating can be performed more accurately since the terminal can have access to sophisticated positioning systems such as GPS which may be present in the vehicle.

In another aspect, the present invention provides a multi user communications terminal apparatus providing simultaneous access for a plurality of users to a communications network in which the geographical locations of each user are registered and periodically updated, the terminal comprising: a plurality of user interface units each including electroacoustic transducers and each lacking an RF stage capable of direct communication to said communications network; a plurality of signal processing units each capable of being associated with one of said user interface units; and a common RF unit to which each of said signal processing units is connectable.

By using a common RF stage and not allowing the users individual RF interfaces, interference with on board electronics and/or surrounding telecommunications systems is minimised, and the cost of the user terminals is reduced.

On the other hand, by providing a plurality of signal processing units (e.g. including the baseband processing stages such as low bit rate coding, signalling and encryption) each communicating user terminal can function almost exactly as a conventional cellular handset, allowing the multi user terminal apparatus readily to be integrated into a satellite or terrestrial cellular network.

By maintaining separate signal processing circuits (e.g. each including a signalling stage) for multiple users, routing of incoming calls to different users is facilitated.

In one embodiment, a signal processing circuit is provided in each user terminal; thus each user terminal functions almost exactly as a conventional cellular handset, but without an individual RF stage (and preferably, as discussed above, without separate position updating messages).

The maximum power available through the common RF stage may be limited to less than the power required to simultaneously support all user terminals. In this case, each user terminal is preferably arranged to enter into a signalling dialogue with the RF stage to determine whether sufficient power is available for it to communicate, prior to setting up a call.

In another embodiment, fewer signal processing circuits than the total number of user terminals are provided, and signal processing circuits are allocated to users as needed via a routing circuit.

This further reduces hardware cost, since the number of signal processing circuits may be constrained to match the total power available from the RF stage.

Preferably, in this case, a store stores details of the correspondence between different users and their respective user terminals, to assist in allocating an incoming call to the right user.

Other aspects and preferred embodiments of the invention are as described or claimed hereafter, with advantages which will be apparent from the following.

BRIEF DESCRIPTION OF THE DRAWINGS

Embodiments of the invention will now be described, by way of example only, with reference to the accompanying drawings, in which:

FIG. 6a illustrates the contents of a store forming part of the database station of FIG. 5;

FIG. 6b illustrates the contents of a store forming part of an earth station node of FIG. 3;

FIG. 13b is a flow diagram showing the corresponding steps performed by the common RF stage in response to the access request of FIG. 13a;

FIG. 21 is a block diagram (corresponding to FIG. 11) indicating the structure of a third embodiment intended to operate in conjunction with credit cards.

GENERAL ASPECTS OF EMBODIMENTS

Figure 1:
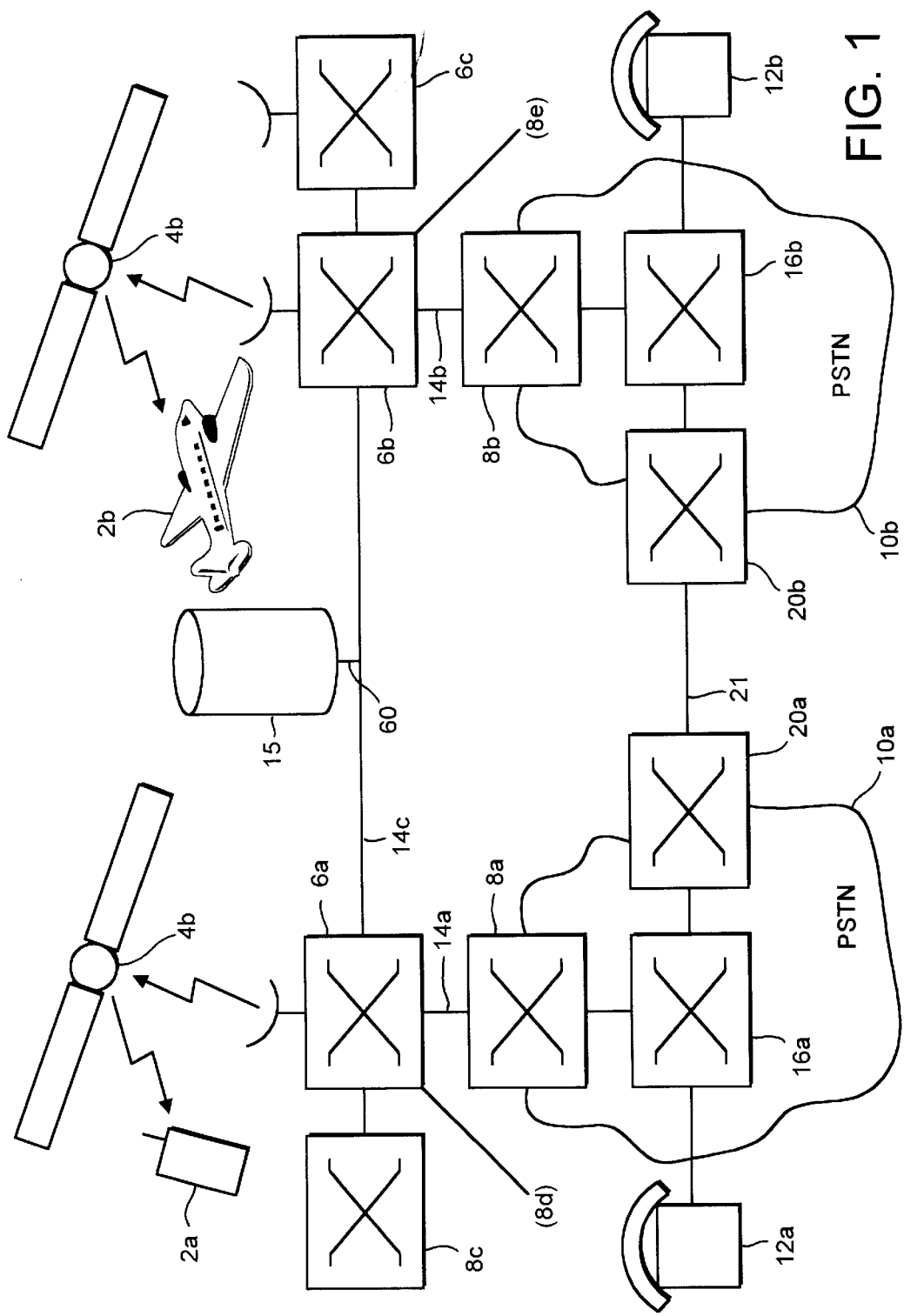
FIG. 1 is a block diagram showing schematically the elements of a first communications system embodying the present invention.

Referring to FIG. 1, a satellite communications network according to this embodiment comprises mobile user terminal equipment $2a,2b$ (e.g. handset $2a$ and vehicle platform $2b$); orbiting relay satellites $4a,4b$; satellite earth station nodes $6a,6b$; satellite system gateway stations $8a,8b$; public switched telecommunications networks $10a,10b$; and fixed telecommunications terminal equipment $12a,12b$.

Interconnecting the satellite system gateways $8a,8b$ with the earth station nodes $6a,6b$, and interconnecting the nodes $6a,6b$ with each other, is a dedicated ground-based network comprising channels $14a,14b,14c$. The satellites 4, earth station nodes 6 and lines 14 make up the infrastructure of the satellite communications network, for communication with the mobile terminals 2, and accessible through the gateway stations 8.

A terminal location database station 15 (equivalent to a GSM HLR) is connected, via a signalling link 60 (e.g. within the channels 14 of the dedicated network) to the gateway station and earth stations 6.

The PSTNs $10a,10b$ comprise, typically, local exchanges $16a,16b$ to which the fixed terminal equipment $12a,12b$ is connected via local loops $18a,18b$; and international switching centres $20a,20b$ connectable one to another via transnational links 21 (for example, satellite links or subsea optical fibre cable links). The PSTNs $10a,10b$ and fixed terminal equipment $12a,12b$ (e.g. telephone instruments) are well known and almost universally available today.

Each mobile terminal apparatus is in communication with a satellite 4 via a full duplex channel (in this embodiment) comprising a downlink channel and an uplink channel, for example (in each case) a TDMA time slot on a particular frequency allocated on initiation of a call, as disclosed in UK patent applications GB 2288913 and GB 2293725. The satellites 4 in this embodiment are non geostationary, and thus, periodically, there is handover from one satellite 4 to another.

Mobile Terminal 2

Figure 2:
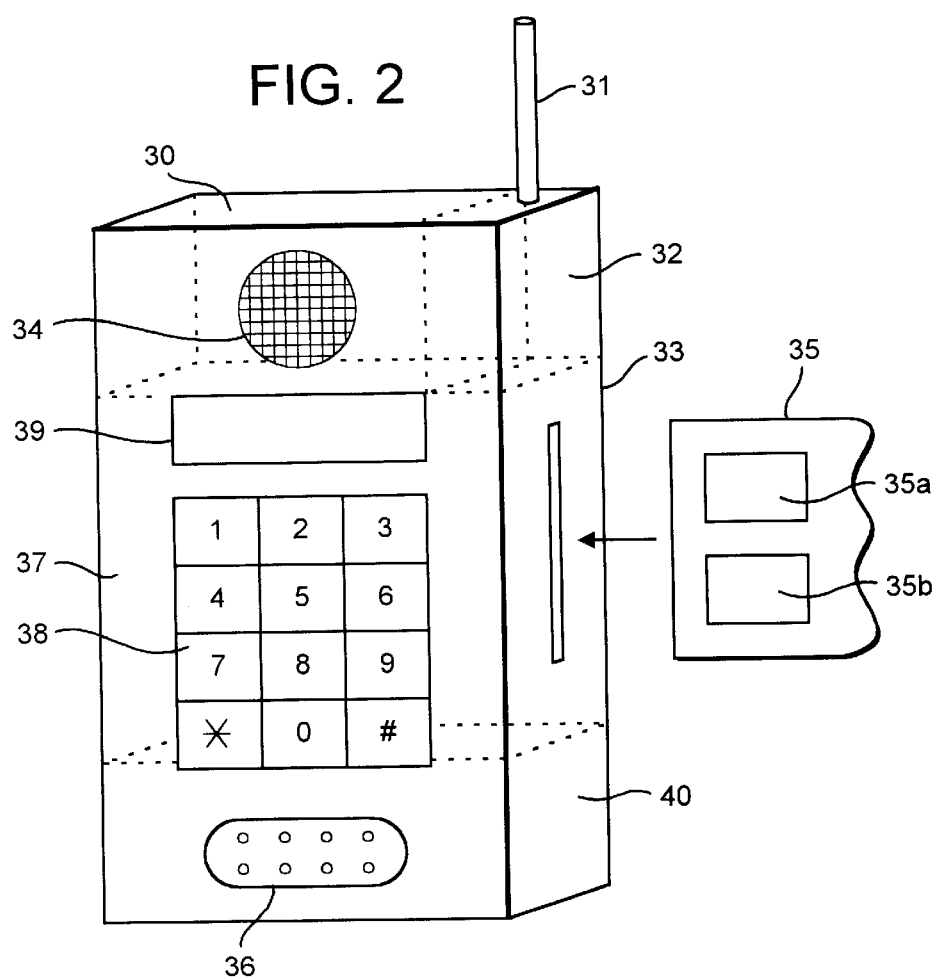
FIG. 2 is a block diagram showing schematically the elements of mobile terminal equipment suitable for use with the present invention.

Referring to FIG. 2, a mobile terminal handset equipment 2a of FIG. 1 is shown.

Details of the handsets 2a,2b etc do not form part of the present invention, but they may comprise handsets similar to those presently available for use with the GSM system, comprising a digital coder/decoder 30, together with conventional microphone 36, loudspeaker 34, battery 40 and keypad components 38, and a radio frequency (RF) interface 32 and antenna 31 suitable for satellite communications. Preferably a display 39 (for example a liquid crystal display) is also provided. A 'smart card' reader 33 receiving a smart card (SIM) 35 storing user information is also provided.

The coder/decoder (codec) 30 in this embodiment comprises a low bit rate coder 30a, generating a speech bit stream at around 3.6 kilobits per second, together with a channel coder 30b applying error correcting encoding, to generate an encoded bit stream at a rate of 4.8 kilobits per second. The low bit rate coder may, for example, be a linear predictive coder such as a multipulse predictive coder (MPLPC) a code book excited linear predictive coder (CELP), a residual excited linear predictive coder (RELP) or a multiband excitation coder. Alternatively, it may employ some form of waveform coding such as subband coding.

The error protection encoding applied may employ block codes, BCH codes, Reed-Solomon codes, turbo codes or convolutional codes. The codec 30 likewise comprises a corresponding channel decoder (e.g. using Viterbi or soft decision coding) and speech decoder.

Also provided is a control circuit 37 (which may in practice be integrated with the coder 30) consisting of a suitably programmed microprocessor, microcontroller or digital signal processor (DSP) chip.

The SIM 35 preferably complies with GSM Recommendations 02.17 ("Subscriber Identity Modules"), and 11.11 and is preferably implemented as an industry standard "Smart Card". The SIM 35 and reader 33 are therefore preferably as described in International Standards ISO 7810, 7811 and 7816; these and GSM 02.17 and 11.11 are all incorporated herein by reference.

Specifically, the SIM 35 includes a processor 35a and permanent memory 35b. The processor 35a is arranged to perform security functions.

The SIM memory 35b stores various subscriber identity data including the international mobile subscriber identity (IMSI), which is a unique number associated with that SIM (and hence the subscriber to whom it belongs).

The handset processor 37 is arranged to store data uniquely identifying the handset, in the form of an international mobile station equipment identity (IMEI). The IMEI identifies the manufacturer and the unique serial number of each handset. Full details of these identification numbers are given in GSM recommendation 03.03, with which this embodiment preferably complies.

The control circuit 37 performs various functions including framing speech and data into TDMA time frames for transmission (and likewise demultiplexing received TDMA frames); and performing encryption or enciphering, either as provided in GSM recommendations 02.09 "security aspects"; 03.20 "security rated network functions"; and 03.21 "security related algorithms"; or as disclosed in our earlier application GB 9611411.1 filed on May 31, 1996 (agents ref: J24017 GB) the contents of which are incorporated herein by reference in their entirety.

The structure of a vehicle platform terminal 2b will be discussed in greater detail below.

Earth Station Node 6

The earth station nodes 6 are arranged for communication with the satellites.

Figure 3:
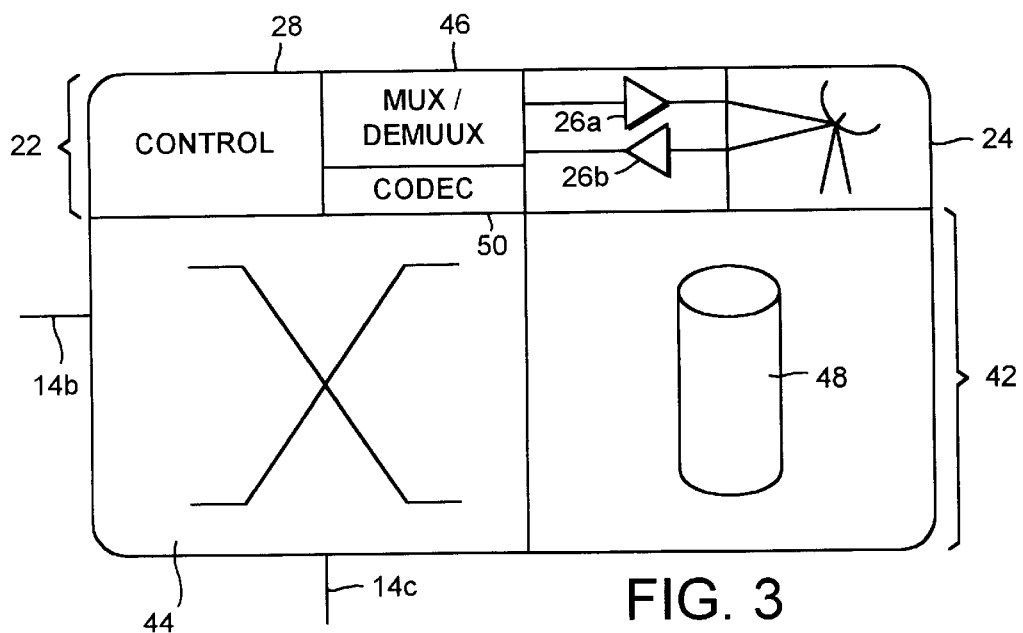
FIG. 3 is a block diagram showing schematically the elements of an Earth station node forming part of the embodiment of FIG. 1.

Each earth station node 6 comprises, as shown in FIG. 3, a conventional satellite earth station 22 consisting of at least one satellite tracking antenna 24 arranged to track at least one moving satellite 4, RF power amplifiers 26a for supplying a signal to the antenna 24, and 26b for receiving a signal from the antenna 24; and a control unit 28 for storing the satellite ephemeris data, controlling the steering of the antenna 24, and effecting any control of the satellite 4 that may be required (by signalling via the antenna 24 to the satellite 4).

The earth station node 6 further comprises a mobile satellite switching centre 42 comprising a network switch 44 connected to the trunk links 14 forming part of the dedicated network. A multiplexer 46 is arranged to receive switched calls from the switch 44 and multiplex them into a composite signal for supply to the amplifier 26 via a low bit-rate voice codec 50. Finally, the earth station node 6 comprises a local store 48 (equivalent to a GSM VLR) storing details of each mobile terminal equipment 2a within the area served by the satellite 4 with which the node 6 is in communication.

Referring to FIG. 6b, the local store 48 stores, amongst other things, the ID number (e.g. international national mobile subscriber identity or IMSI) of the mobile terminal 2; the status (e.g. local or global) of the terminal; the last known geographical position of the terminal; the satellite 4 through which communication with the mobile terminal is to be attempted and the beam within that satellite; an indication of whether the terminal is or is not available for communication; and an indication of the home gateway 8 of the terminal. Naturally, other data (e.g. authentication data) may also be stored.

Gateway 8

Figure 4:
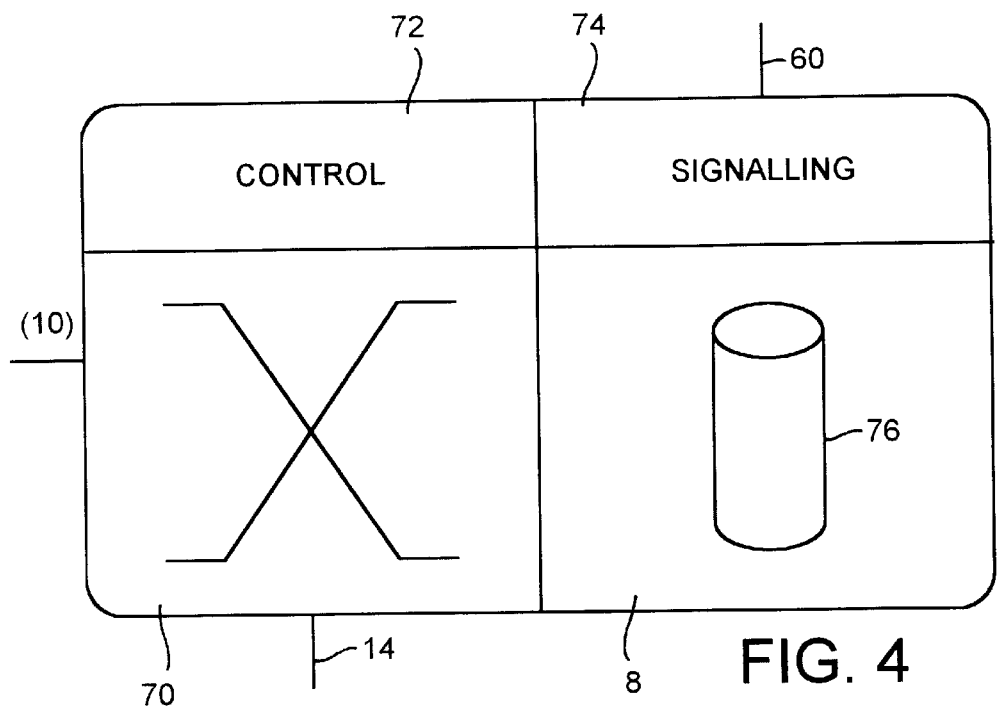
FIG. 4 is a block diagram showing schematically the elements of a gateway station forming part of the embodiment of FIG. 1.

Referring to FIG. 4, the gateway stations 8a,8b comprise, in this embodiment, commercially available mobile switch centres (MSCs) of the type used in digital mobile cellular radio systems such as GSM systems. They could alternatively comprise a part of an international or other exchange forming one of the PSTNs 10a,10b operating under software control to interconnect the networks 10 with the satellite system trunk lines 14.

The gateway stations 8 comprise a switch 70 arranged to interconnect incoming PSTN lines from the PSTN 10 with dedicated service lines 14 connected to one or more Earth station nodes 6, under control of a control unit 72. The control unit 72 is capable of communicating with the data channel 60 connected to the database station 15 via a signalling unit 74, and is arranged to generate data messages in some suitable format (e.g. as packets or ATM cells).

Also provided in the gateway station 8 is a store 76 storing billing, service and other information relating to those mobile terminals 2 for which the gateway station 8 is the home gateway station. Data is written to the store 76 by the control unit 72 after being received via the signalling unit 74 or switch 70, from the PSTN 10 or the Earth station nodes 6 making up the satellite network.

The satellite system trunk lines 14 comprise, in this embodiment, high quality leased lines meeting acceptable minimum criteria for signal degradation and delay. In this embodiment, all the lines 14 comprise terrestrial links. The trunk lines 14 are preferably dedicated lines, so that the lines 14 form a separate set of physical channels to the networks 10. However, the use of virtual circuits through the networks 10 is not excluded.

The embodiments described in our earlier application GB 9610389.0 filed on May 17, 1996 (agents ref J24016GB), incorporated herein by reference, may be employed.

Database Station 15

Figure 5:
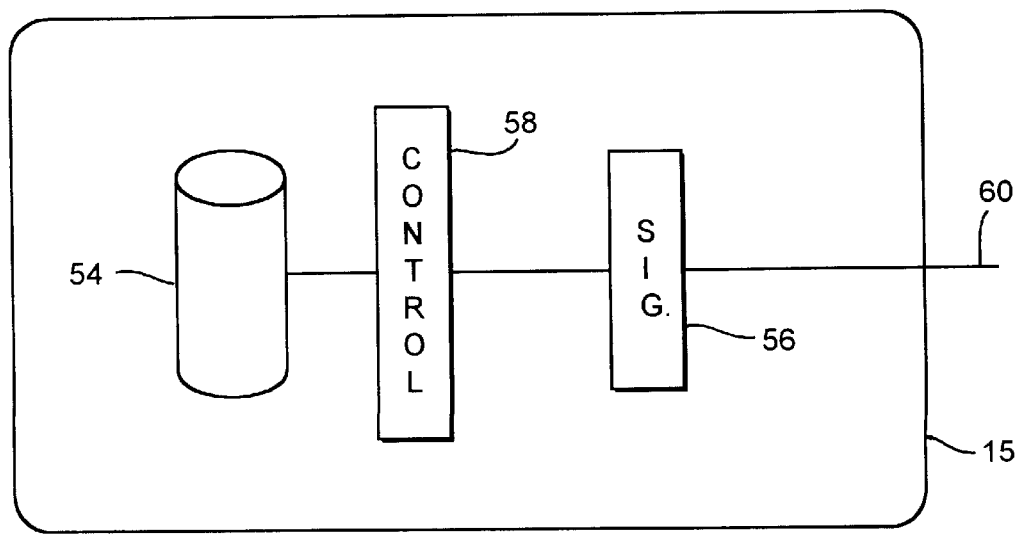
FIG. 5 is a block diagram showing schematically the elements of a database station forming part of the embodiment of FIG. 1.

Referring to FIG. 5 the home database station 15 comprises a digital data store 54, a signalling circuit 56, a processor 58 interconnected with the signalling circuit 56 and the store 54, and a signalling link 60 interconnecting the database station 15 with the gateway stations 8 and Earth stations 6 making up satellite system network, for signalling or data message communications.

The store 54 contains, for every subscriber terminal apparatus 2, a record showing the current status of the terminal 2 (whether it is "local" or "global"; authentication data unique to each mobile terminal for validating the mobile terminal; the "home" gateway station 8 with which the apparatus is registered (to enable billing and other data to be collected at a single point) and the currently active Earth station node 6 with which the apparatus 2 is in communication via the satellite 4. The contents of the store are indicated in FIG. 6a.

The signalling unit 56 and processor are arranged to receive interrogating data messages, via the signalling circuit 60 (which may be a packet switched connection), from gateways 8 or nodes 6, comprising data identifying one of the mobile terminals 2 (for example, the telephone number of the equipment 2), and the processor 58 is arranged to search the store 54 for the status and active earth station node 6 of the terminal 2 and to transmit these in a reply message via the data line 60.

Satellites 4

Figure 7A:
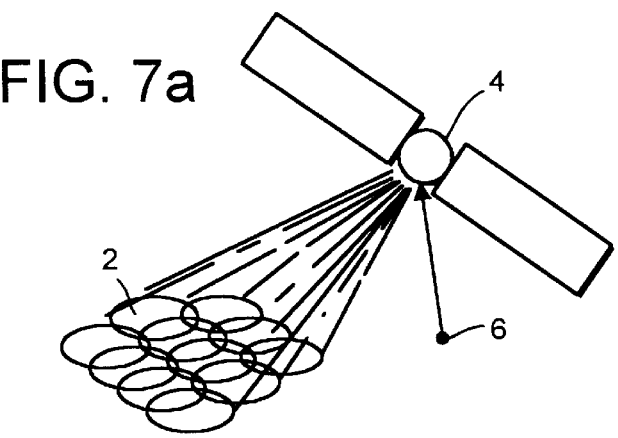
FIG. 7a illustrates schematically the beams produced by a satellite in the embodiment of FIG. 1.

The satellites 4a,4b comprise generally conventional communications satellites, and may be as disclosed in GB 2288913. Each satellite 4 is arranged to generate an array of beams covering a footprint beneath the satellite, each beam including a number of different frequency channels and time slots, as described in GB 2293725 and illustrated in FIG. 7a.

On each beam, the satellite therefore transmits a set of downlink frequencies. The downlink frequencies on adjacent beams are different, so as to permit frequency re-use between beams. Each beam therefore acts somewhat in the manner of a cell of a conventional terrestrial cellular system.

In this embodiment each downlink frequency carries a plurality of time division channels, so that each mobile terminal 2 communicates on a channel comprising a given time slot in a given frequency.

Within each beam there is also provided a common broadcast control channel (equivalent to the broadcast common control channel or BCCH of the GSM system) which occupies at least one of the frequencies for each beam; the frequencies used by the broadcast control channels of the beams are stored within each mobile terminal 2 which is arranged to scan these frequencies repeatedly.

Figure 8:
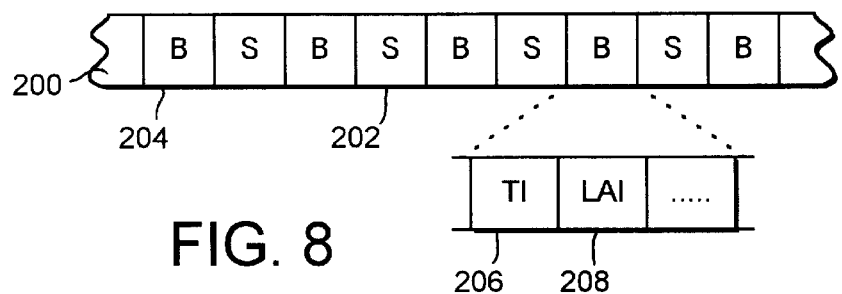
FIG. 8 is a diagram showing schematically the structure of a control channel carried by a satellite beam of FIG. 7a in the embodiments of FIG. 1.

Referring to FIG. 8, each broadcast control channel 200 comprises interleaved synchronisation periods 202 (labelled "S") and broadcast data periods 204 (labelled "B"). Thus, mobile terminals 2 are able to acquire time and frequency synchronisation with the broadcast control channel (and hence the other communications channels) prior to reading the broadcast data 204.

The broadcast data includes, amongst other things, a field 206 containing a time value T1 specifying a re-registration interval (as in the GSM system, specified as a number of 6 minute increments); and a location area identifier field 208 indicating the number of the beam. For example, there may be 121 or 163 beams each carrying a respective number. The number of the satellite may also be indicated within the location area identifier 208.

Figure 7B:
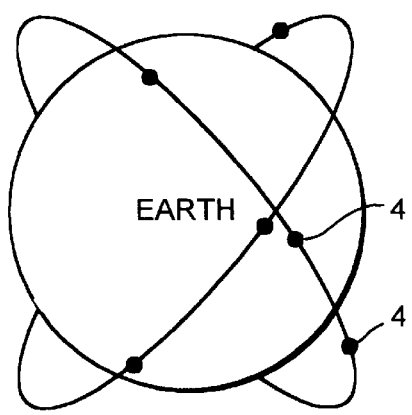
FIG. 7b illustrates schematically the disposition of satellites forming part of FIG. 1 in orbits around the earth.

The satellites 4a are arranged in a constellation in sufficient numbers and suitable orbits to cover a substantial area of the globe (preferably to give global coverage). For example 10 (or more) satellites may be provided in two mutually orthogonal intermediate circular orbits (or more) at an altitude of, for example, 10,500 kilometres (6 hour orbits) as shown in FIG. 7b. Equally, however, larger numbers of lower satellites may be used, as disclosed in EP 0365885, or other publications relating to the Iridium system, for example.

Geographical Arrangement

With the number of satellites mentioned below, there may typically be 12 earth station nodes 6, two for each continent. In this manner, each earth station node 6 is connectable to gateways 8 on the continent, whilst having in view one or more satellites 4.

In this embodiment there are a significantly larger number of gateways 8 than of earth station nodes 6; on the order of one per country (i.e. over a hundred in total). For larger countries, several gateways 8 may be provided, at different geographical locations, or (where several network operators are permitted in the country) one per PSTN for different PSTNs. Smaller countries may share gateways 8. Gateways 8 may also be provided from terrestrial cellular networks.

Registration and Location

A customer mobile terminal apparatus 2 may be registered with one of two distinct statuses; "local" in which the mobile terminal apparatus is permitted only to communicate through one local area, or part of the satellite system network, and "global", which entitles the apparatus to communicate through any part of the satellite system network.

The status of each apparatus 2 (i.e. "local" or "global") is stored in the record held for the apparatus 2 concerned in the stores 54 and 48.

The operation of the above embodiment will now be described in greater detail.

The mobile terminal apparatus 2a performs an automatic registration process, of the kind well known in the art of cellular terrestrial communications, on various occasions. As is conventional, the registration process includes the broadcasting of a signal identifying the mobile terminal 2 on a common hailing or signalling frequency (such as the BCCH uplink).

The transmitted signal is picked up by one or more satellites 4. Under normal circumstances, the signal is picked up by multiple satellites 4 and forwarded to the earth station node or nodes 6 with which the satellites 4 are in communication.

The location updating process itself is generally similar to that performed within the GSM system, but for clarity a brief description will be given with reference to FIGS. 9a and 9b.

Figure 9A:
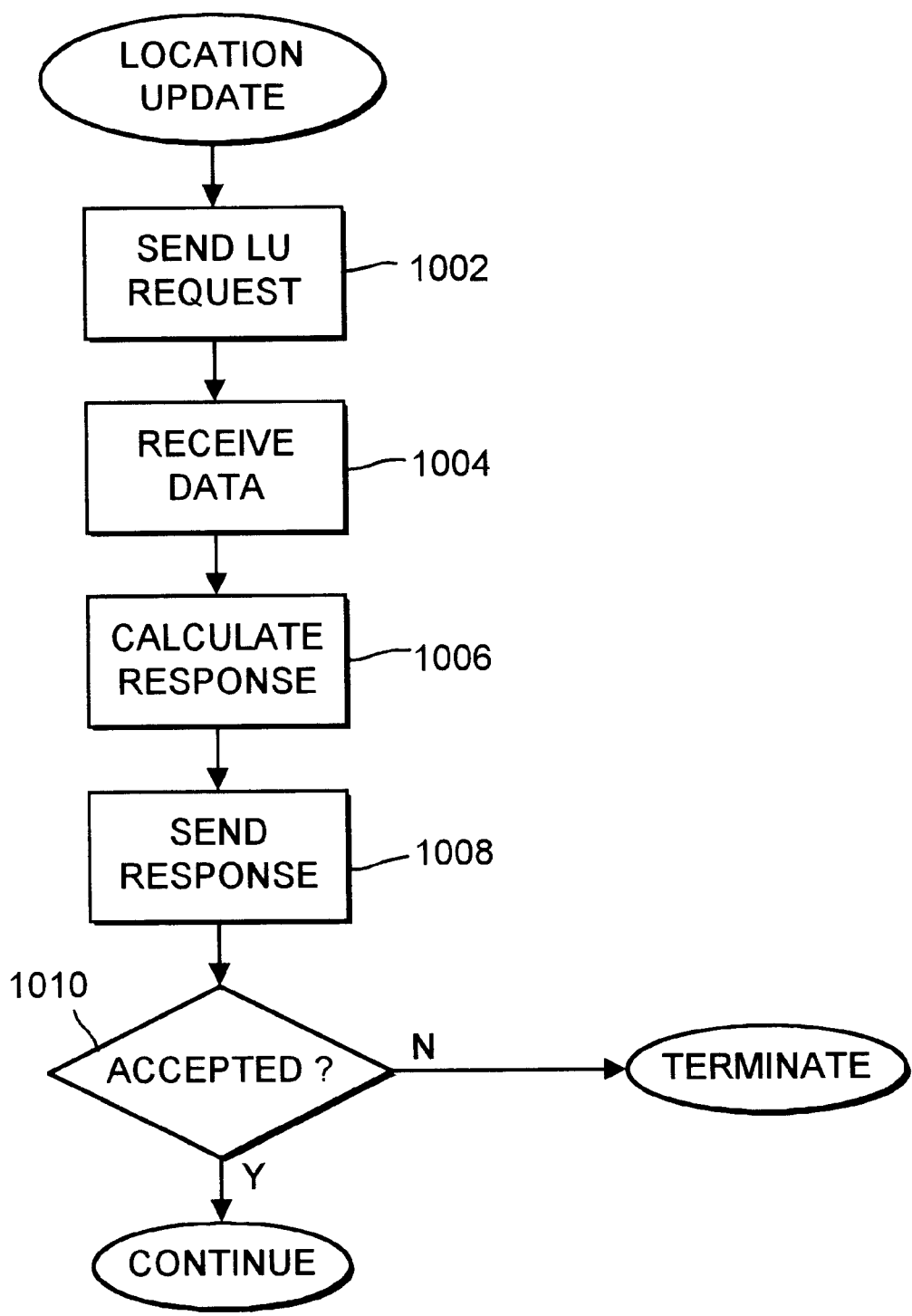
FIG. 9a is a flow diagram illustrating in general terms the steps of a location updating process performed by a user terminal.

Referring to FIG. 9a, in a step 1002 the control processor 35 of the mobile terminal 2 transmits a location update request signal, which is relayed by at least one satellite 4 to at least one earth station 6.

The location update request includes an ID code indicating the mobile terminal (equivalent to the international mobile subscriber identity (IMSI) or temporary mobile subscriber identity (TMSI) used in the GSM system) and further includes the location area identifer (LAI) received by the mobile terminal 2 on the broadcast control channel (BCCH) to which it has synchronised.

Additionally, in this embodiment, the mobile terminal may depart from the GSM location update message format, by including a field indicating its own position as position coordinates, if it has this information available (e.g. from navigation systems such as GPS).

Figure 9B:
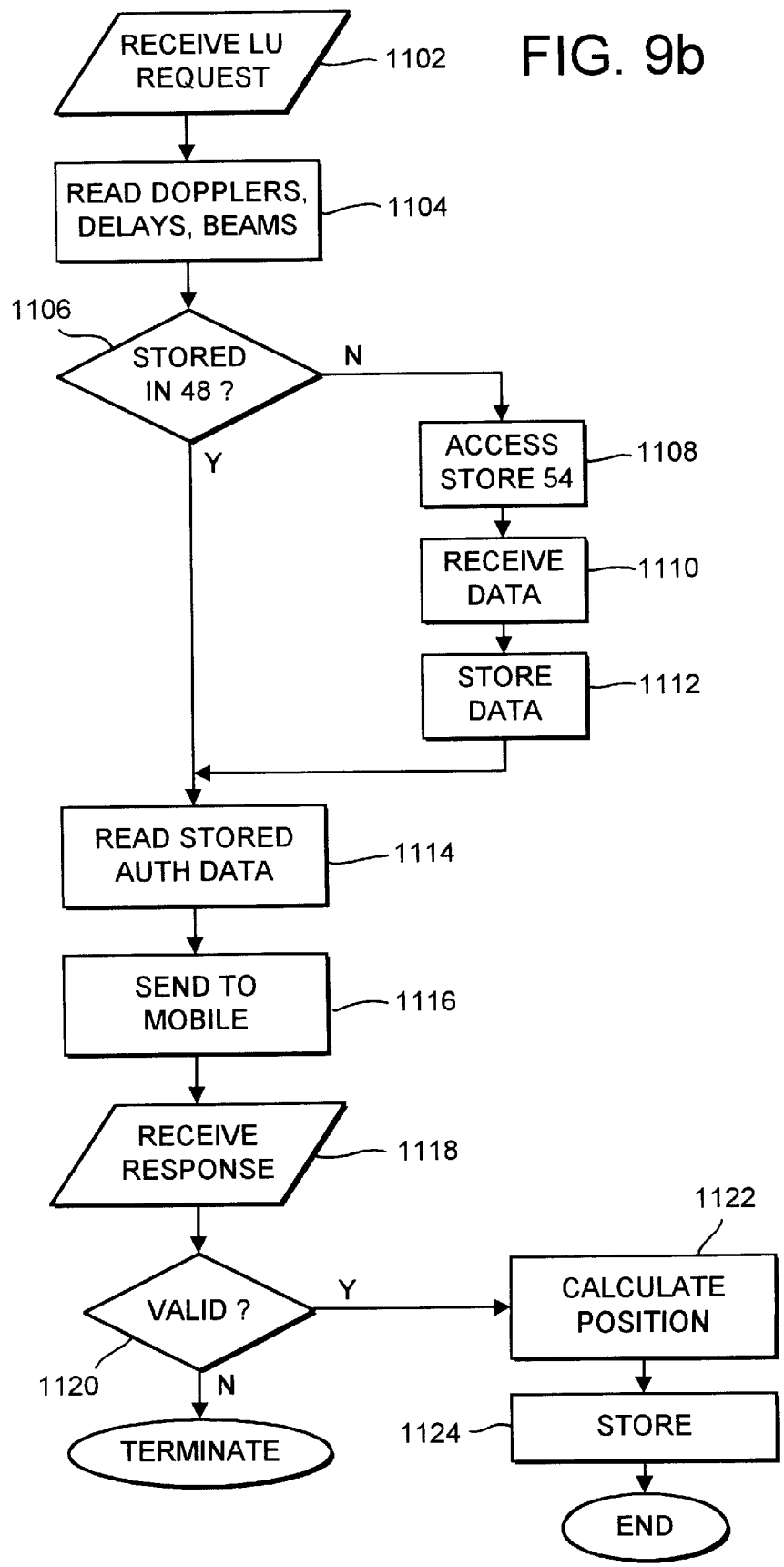
FIG. 9b is a flow diagram showing in general terms the steps performed by the earth station node during the location updating.

Referring to FIG. 9b, the earth station 6 receives, in a step 1102, the location update request and reads the Doppler shift and relative arrival time of the signal via the or each satellite 4 in a step 1104.

In a step 1106, the earth station node 6 determines whether the ID number of the mobile terminal is held within the local store 48.

If details of the mobile terminal are not already stored in the database 48, the earth station node 6 signals to the database station 15 via the signalling link 16 to request details of the mobile terminal.

The database station 15 accesses the database 54 thereof and supplies data concerning the mobile terminal, including in particular authentication data, to the earth station node 6 (step 1108). The earth station node receives the authentication data in step 1110 and stores the data within the database 48 in step 1112.

In step 1114, the earth station node 6 reads the stored authentication data which comprises, conveniently, the same data as is used in GSM; namely a triplet comprising a random number (RAND); an individual terminal key ($K_i$) and a signed response (SRES) created by enciphering the random number using a predetermined algorithm (A3) utilising the individual terminal key $K_i$.

The random number is then transmitted (step 1116) via the satellite 4 to the mobile terminal 2, at which (FIG. 8a, step 1004) it is received.

In step 1006, the mobile terminal 2 (which has stored therein the individual terminal key $K_i$ and the algorithm A3) uses the received random number to calculate the signed response (SRES) which is then transmitted back to the earth station node 6 via the satellite 4 in step 1008.

On receipt thereof (FIG. 9b, step 1118) the earth station node 6 compares the received response with the signed response (SRES) it received from the central database station 15 in step 1120, and if the two do not match then service to the mobile terminal is discontinued, on the assumption that it is not authentic.

If the two do match, then in step 1122, the earth station node calculates the rough terrestrial position of the mobile terminal apparatus 2 using the differential arrival times and/or Doppler shifts in the received signal, and knowledge of which beams of which satellites 4 the signal was received through. The position is then stored in the database 48 in step 1124; if the user terminal has supplied a position measurement, then provided this approximately matches the rough terrestrial position thus calculated the supplied position measurement is instead stored in the database 48.

At the mobile terminal 2, it is determined (step 1010) whether the authentication has validated the mobile terminal and, if so, normal operation of the terminal continues. If not, the terminal may, for example, indicate on the display 39 that service has been refused.

The earth station node 6 also determines with which satellite 4 and beam to communicate with the mobile terminal 2, and stores the identities of satellite and beam in the database 48.

Call Set Up and Routing

The processes of routing calls to and from mobile terminal apparatus 2 are generally described in GB-A-2295296 or WO96/16488, both of which are hereby incorporated fully by reference. Briefly, for a local user outside its area, a call placed to the user or from the user is referred to the database station 15 which determines that the user is outside of its area and thereafter does not process the call. For a local user which is inside its area, in the preferred embodiment described in the above referenced British and International application, calls to or from the user are set up over the satellite link, via the active earth station 6, the ground network, and the international public switch telephone network (PSTN) from the nearest gateway 8 to the terrestrial user.

For global users, calls are routed via the satellite and the active earth station, then via the ground network to the gateway station 8 nearest to the terrestrial user.

The dial numbers allocated to mobile users may have "International" prefixes followed by a code corresponding to the satellite service network. Alternatively, they could have a national prefix followed by a regional code assigned to the satellite service.

Calls between one mobile user and another are carried out by directing the signal via a first satellite link down to the active earth station node of the first mobile user, via the ground network to the active earth station node of the second mobile user (which may be, but is not necessarily, the same as that of the first) and then via a second satellite link (which may, but does not need to be via the same satellite) to the second mobile user.

After the active node data stored in the database station 15 has been used to direct an incoming call to the active earth station node 6 for a given destination mobile terminal, the earth station 6 examines the database 48 to determine the most recently recorded position for the mobile terminal and the most recently recorded satellite and beam.

A signal (equivalent to the paging signal of GSM) is sent on the downlink control channel (BCCH) on the identified beam of the identified satellite. If no response is received from the mobile terminal 2, the earth station node 6 examines the position stored in respect of the mobile terminal 2 within the database 48, and determines whether another beam and/or another satellite is also geometrically able to reach the user terminal 6; if so, the paging signal is repeated on the or each such beam and satellite until such contact is made.

The store 54 acts somewhat in the manner of the Home Location Register (HLR) of a GSM terrestrial cellular system, and the store 48 in the manner of the Visiting Location Register (VLR) of GSM; commercially available HLR and/or VLR equipment may therefore be employed for these components, modified as necessary.

First Embodiment

Figure 10:
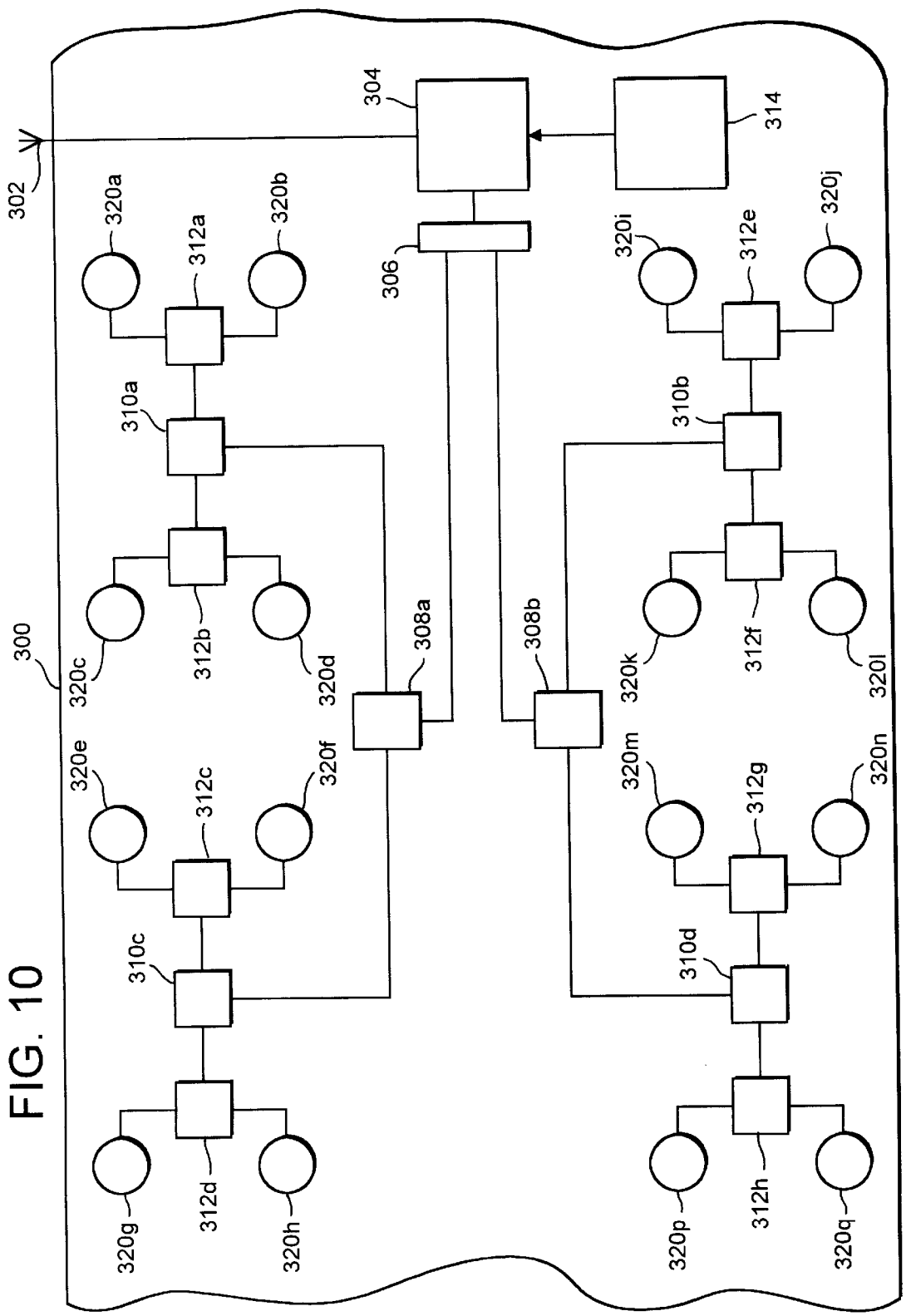
FIG. 10 is a block diagram showing the arrangement of a multi user terminal within a vehicle according to the first embodiment.

Referring to FIG. 10 a vehicle 300 (for example an aircraft) carries an antenna system 302 coupled to a common RF stage 304. The RF stage 304 is coupled via an IF distribution system/combiner network (306–312) to a plurality of user terminal devices 320a–320q provided in arm rests or backs of seats (not shown) of the plane 300.

In this embodiment, the IF distribution system 306–312 comprises a tree structure of splitter/combiners, comprising a root unit 306 connected to two branch units 308a,308b each of which is connected to a respective pair of branch units 310a,310c; 310b,310d; each of which is in turn connected to a respective pair of branch units (312a,312b; 312c,312d; 312e,312f; 312g,312h).

Each splitter/combiner stage 306 comprises: on the uplink path from the user terminals, an amplifier and a two-to-one combiner; and, on the downlink path from the terminals, an amplifier and a one-to-two splitter.

As shown in FIG. 10, the distribution of the stages 306–312 is arranged such that the runs of electrical cable connecting to the two ports of each splitter are equal; thus, the path from all user terminals to the root stage 306, and to the RF stage 304 to which it is connected, is the same.

Figure 11:
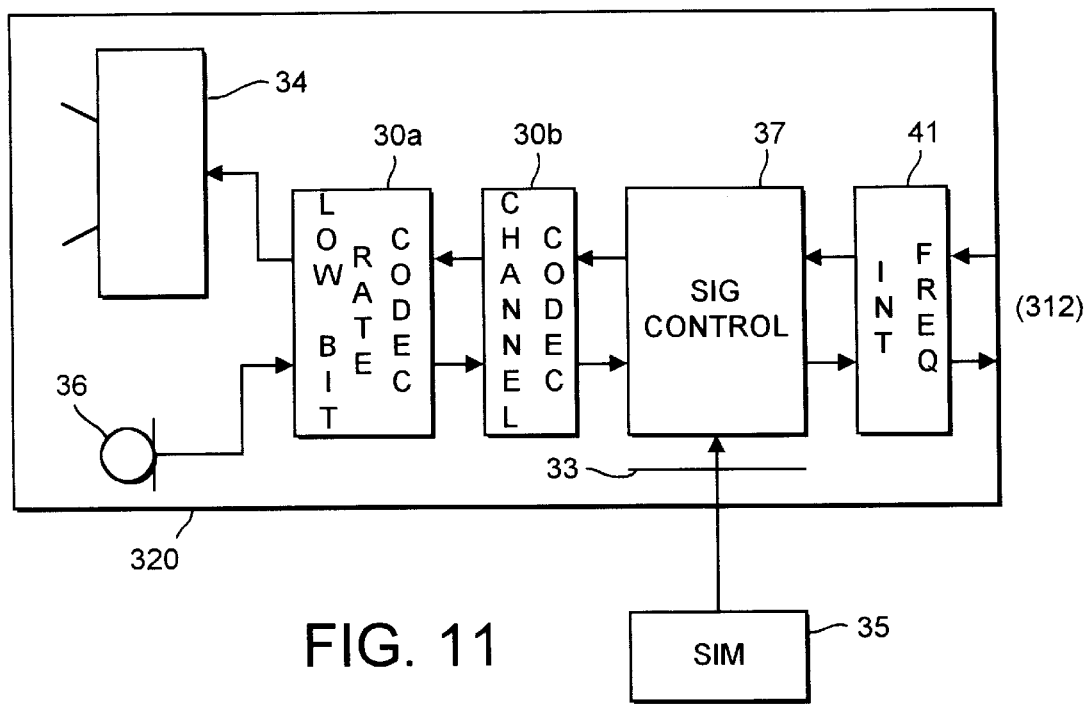
FIG. 11 is a block diagram showing the structure of a user terminal forming part of the embodiment of FIG. 10.

Referring to FIG. 11, each user terminal 320 in this embodiment comprises a handset similar to the mobile handset of FIG. 2 and equivalent components have the same references, but lacks batteries (power being supplied from a common aircraft power source, not shown), antenna 31, and RF stage 32. The keypad 38 and display 39, both of which are coupled to the control unit 37, are omitted from FIG. 11 for clarity.

Signalling (and where desired, encryption) is supplied by the control unit 37, which is coupled to an intermediate frequency modulator (IF) 41 which applies a predetermined IF offset to the baseband voice and signalling data signal, produced by the codec 30 in accordance with a selected frequency channel.

The intermediate frequency (IF) stage 41 is coupled to the nearest splitter/combiner stage 312 and thence to the common RF stage 304.

The card reader 33 is arranged to accept a subscriber information module (SIM) 35 from any customer occupying the seat.

By way of distinction from conventional user terminals, however, each of the terminal processors 37 carries the same IMEI code, which is therefore characteristic of the vehicle 300 rather than of any of the user terminals 320.

Figure 12:
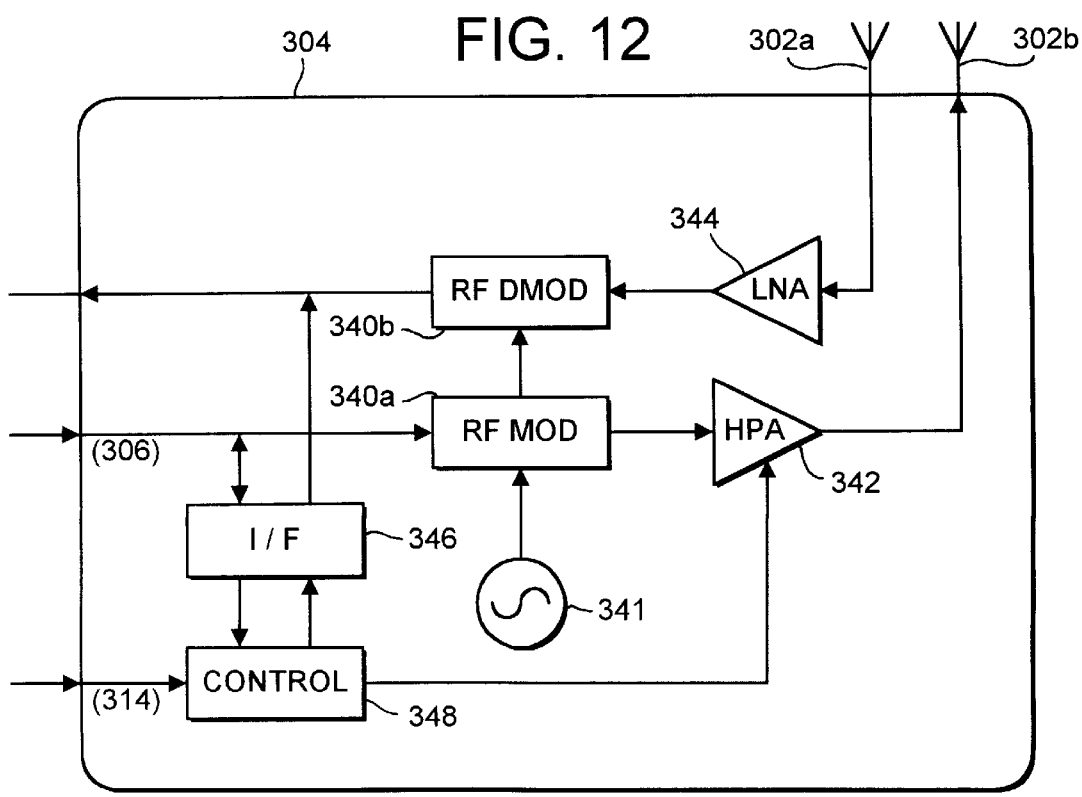
FIG. 12 is a block diagram showing the structure of a common RF stage forming part of the embodiment of FIG. 10.

Referring now to FIG. 12, the RF stage 304 comprises an RF modulator stage 340 receiving the combined IF signals from all user terminals 320 and modulating them onto a frequency determined by an RF oscillator 341, and a high power amplifier (HPA) 342 amplifying the output of the RF modulator 340a and supplying a high power signal to a port 302b of the antenna system 302.

It further comprises a low noise amplifier (LNA) 344, connected to an input port 302a of the antenna system 302 to amplify the signal received from a satellite 4, and to supply the amplified signal to an RF demodulator 340b which down converts the received signal to intermediate frequency for supply to the IF distribution network 306–321. The LNA may, in practice, be mounted adjacent the antenna system 302.

A control unit 348 (i.e. a microprocessor and/or digital signal processor chip) is arranged to receive signals from the user terminals 320 and transmit signals back thereto, and to insert signals into the IF composite signal for transmission to a satellite 4, via an IF interface 346.

The control unit 348 is also coupled to a navigation system 314 comprising, in this embodiment, a GPS satellite radio determination system, arranged to supply position co-ordinates to the control unit 314.

At any given time, not all passengers will wish, or be able, to communicate. It is therefore generally unnecessary for the high power amplifier 342 to support N simultaneous calls (where N is the total number of user terminals 320). In this embodiment, the HPA 342 is sufficiently powerful to support n+k simultaneous calls, where n is substantially smaller than N, and is the average number of likely simultaneous users, and k is a margin to allow for signalling traffic.

The power supplied by the HPA 342 is controlled by the control unit 348, in dependence upon signals received from the earth station nodes 6, to reduce the transmitted power to a minimum satisfactory level so as to reduce interference, cross talk and intermodulation distortion.

The antenna system 302 could comprise omnidirectional antennas, but in this embodiment it comprises directional high gain transmit and receive antennas.

For example, a multibeam antenna capable of selecting one of a grid of beams which is best aligned with a satellite 4 is employed; the antenna system 302 therefore comprises a beam former, preferably, an analog beam former such as a Butler Matrix (as discussed in GB 2288913A and WO 95/28747, incorporated herein by reference), and the control unit 348 is arranged to monitor the beam outputs, and select one of the beams giving the highest strength as pointing closest to a desired satellite 4.

Operation of the above described apparatus will now be disclosed in greater detail.

Outgoing Call Set Up

Figure 13A:
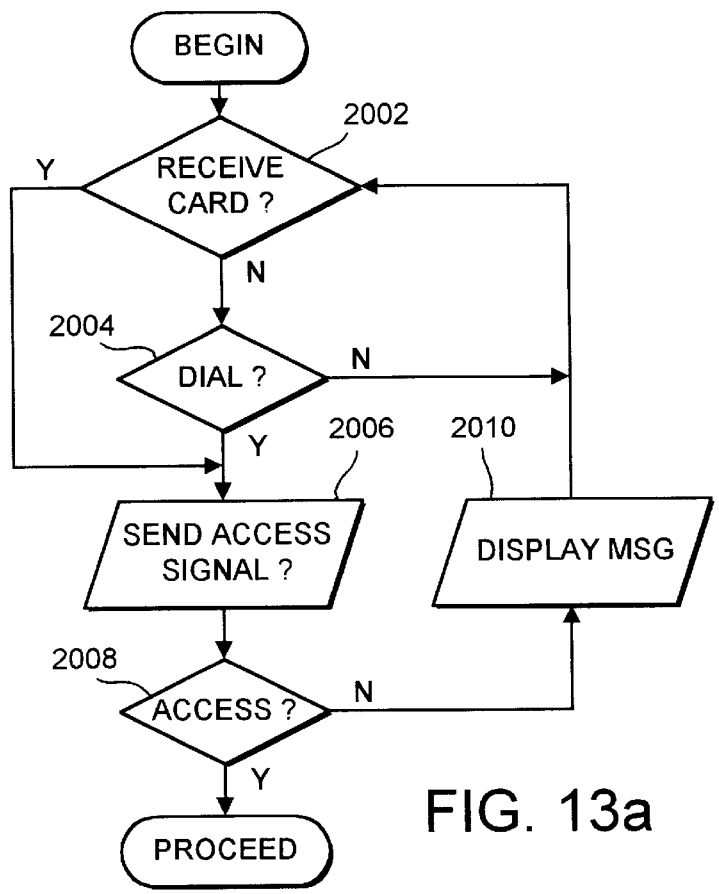
FIG. 13a is a flow diagram showing the process performed by the user terminal of FIG. 11 on requesting access for an outgoing call.

Referring to FIG. 13a, a user wishing to utilise one of the user terminals 320 first inserts an SIM in a step 2002. In step 2004, the user terminal processor 37 recognises an attempt to dial a number terminated for example by pressing a "send" key. On detection of such an insertion or dial attempt, in a step 2006 the user terminal 320 signals, on a terminal specific signalling frequency, to the RF stage 304, which receives the access request signal in a step 2102.

The received signal is demodulated by the IF stage 346 and passed to the control device 348, which reads the current high power amplifier power setting in a step 2104 and determines, in a step 2106, whether this exceeds a predetermined threshold Th (equivalent to (n+k)*P where P is the average power level required for a call).

If the threshold is exceeded, the control unit 348 signals back, via the interface 346, an access refusal signal in step 2108. In a step 2008, the user terminal 320 determines whether an access refusal signal has been received and if so, displays (in step 2010) an "access refused" message on the display 39. An audio indication may also or alternatively be given via the loudspeaker 34.

If the current power level of the HPA is below the threshold, then in step 2110 the control unit 348 permits connection of the user terminal 320 to the RF modulator stage 34a. From this point, the user terminal 320 follows the signalling procedures of a conventional GSM handset, except (as discussed below in greater detail) that it does not perform location updating. Where an SIM 35 was newly inserted, a registration signalling dialogue (as discussed in greater detail below) is performed. Where a dial attempt is detected a call is set up.

Incoming Call

Figure 13B:
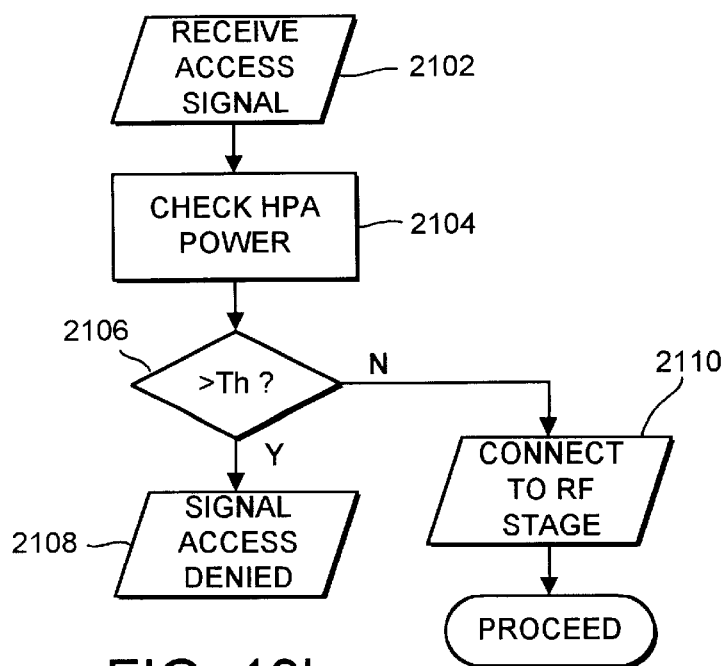

For incoming calls, when a user terminal 320 is paged, the page is passed on to the user terminal. At this point, in response, the user terminal 320 enters into the signalling dialogue of FIGS. 13a and 13b with the RF stage 304 before access is permitted. If access is denied, an access denial signal is transmitted back to the calling party to indicate temporary unavailability (for example in the form of a "line busy" indication).

Location Updating

As indicated above, the processors 37 of the user terminals 320 are arranged not to voluntarily perform location updating. Instead, location updating is performed by the control unit 348 of the RF stage 304 acting in the manner of a user terminal. The control unit 348 is arranged, firstly, to scan the BCCH carriers of all beams received by the antenna system 302 and to perform location updating as described above whenever a new location identifier (LAI) is detected; secondly, to perform location updating whenever the position data received from the navigation system 314 indicates a significant change of position since last updating; and thirdly to perform location updating at least more frequently than the minimum time interval T1 specified on the beam broadcast channels received by the antenna system 302. Thus, the control unit 348 performs relatively frequent location updates.

Each location update message contains (in addition to the LAI code) the position according to the positioning system 314; and the equipment identifier code IMEI. This code is also transmitted by each user terminal 320 during registration on call set up, since all user terminals 320 have the same IMEI.

The actions performed by each earth station node 6 in location updating will now be described in greater detail.

Figure 14:
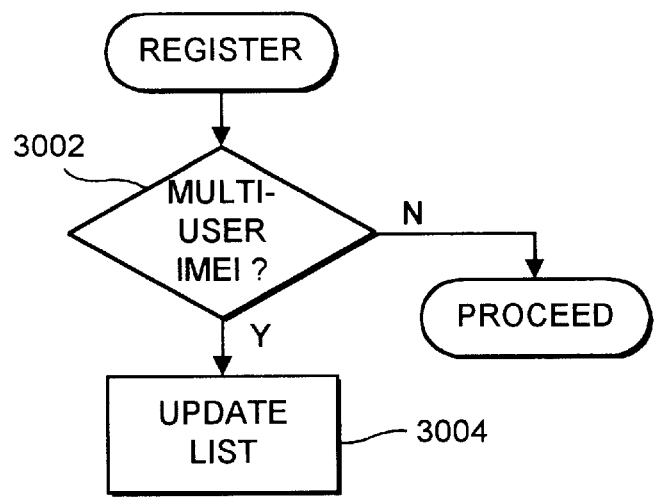
FIG. 14 is a flow diagram showing the process performed by an earth station of FIG. 1 on registration of a multi user terminal in the first embodiment.

Referring to FIG. 14, on each occasion (step 3002) when a registration signal is received from a terminal 320 the IMEI code of which indicates that it is a multi carrier terminal, the earth station node 6 updates (step 3004) a list within the database 48.

On first receipt of a registration with a multi carrier equipment identity code, a new list of subscribers is created for that IMEI code (corresponding to the subscribers within the vehicle 300). Any subsequent different entities (i.e. having different mobile subscriber identity codes) with the same equipment identity code are added to the list.

Thus, for each vehicle 300 registered with an earth station node 6, a list of subscribers aboard the vehicle 300 is created in the database 48 for that earth station node, containing pointers to the positions of the records of the subscribers within the store 48.

At the end of each flight, the control unit 348 is arranged to transmit a list-clearing signal to cause the erasure of the corresponding list within the earth station node 6 at which it is held.

Figure 15:
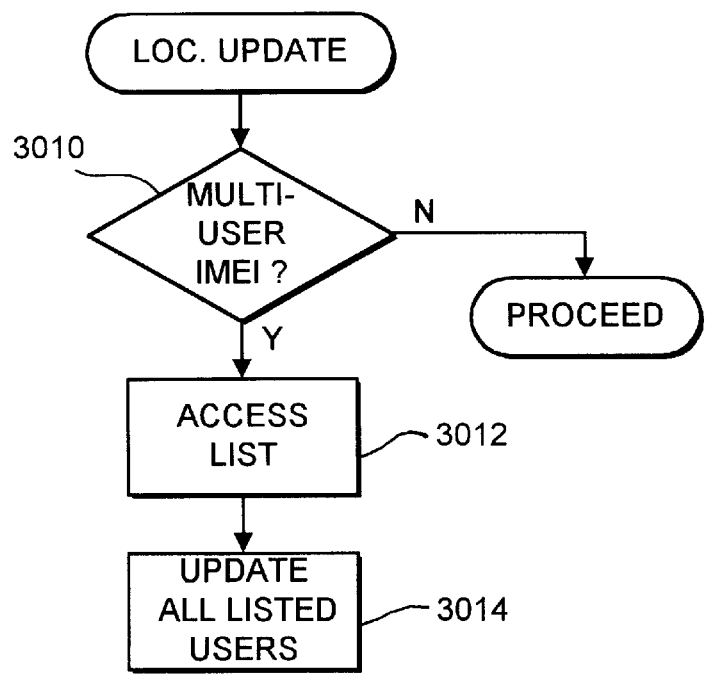
FIG. 15 is a flow diagram showing the steps performed by the earth station node on location updating in the first embodiment.

Referring to FIG. 15, on each occasion when a location update signal is received at the earth station node 6, the earth station node 6 determines (step 3010) whether the location update signal includes a multi-carrier IMEI code, and if so, the earth station node 6 reads the list of subscribers sharing that IMEI code stored in the database 48 (step 3012) and accesses the records for all subscribers on the list (step 3014) to update their current satellite, beam and position data to the values received within the location updating signal.

Thus, in this embodiment, the processor 340 of the common RF stage 304 is able to supply location updating signalling data which is used to update the positions of all subscribers registered via user terminals 320 on the vehicle 300.

This achieves accurate positioning of all such subscribers, since the vehicle 300 often includes a sophisticated position determination system such as a GPS positioning system 314. Additionally, even though location updating is performed relatively frequently and accurately, the total volume of signalling traffic is relatively low, and only a single channel is required, thus reducing demands on the RF stage 304.

Further, significant hardware economies are achieved since relatively expensive RF stages are not required for each handset 320, and performance is improved since high gain and high power antennas may be employed.

Second Embodiment

In the second embodiment, the hardware expense is further reduced by further simplifying the content of each user terminal.

Figure 16:
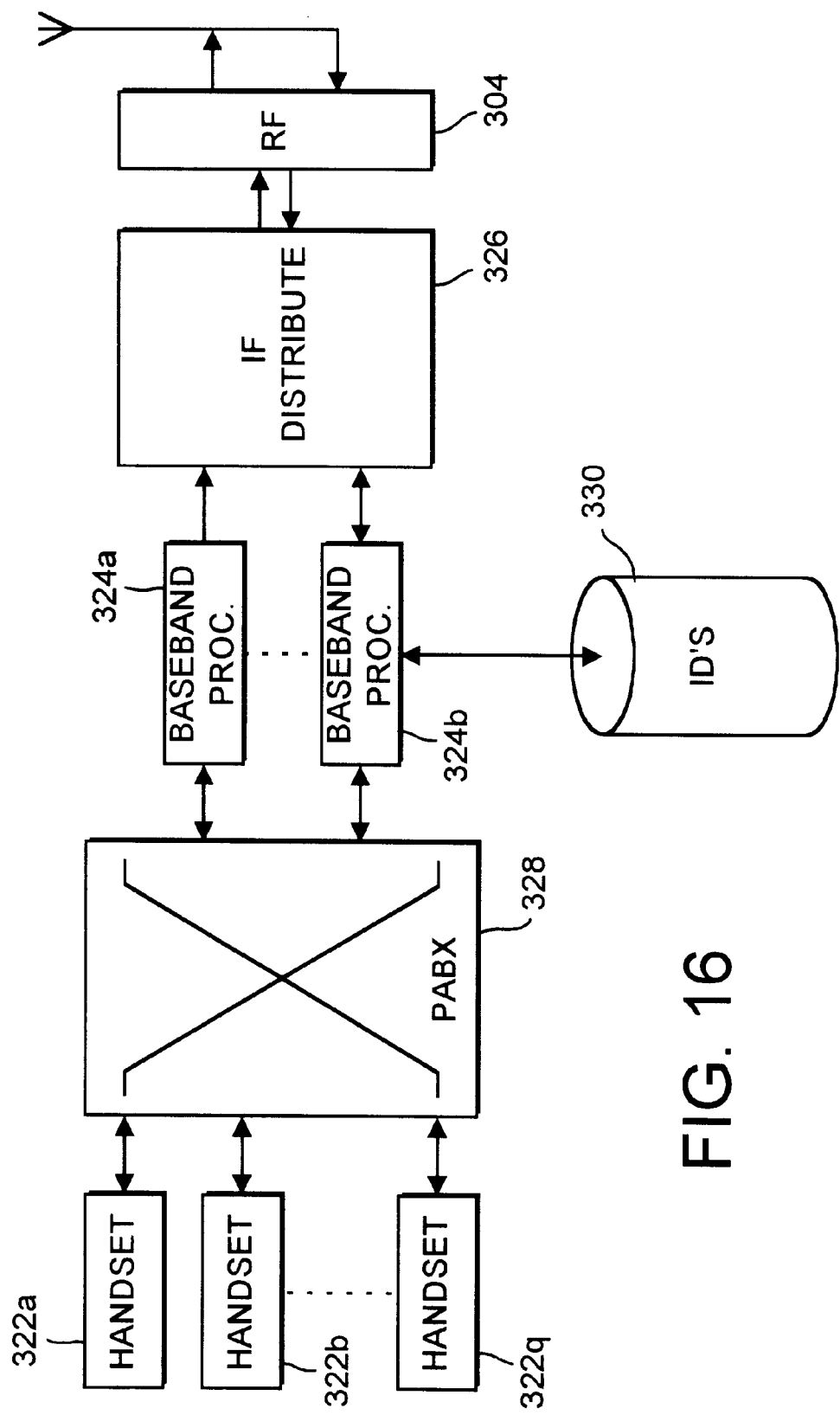
FIG. 16 is a block diagram showing schematically the structure of a multi user terminal according to a second embodiment.

Accordingly, referring to FIG. 16, in this embodiment, each user terminal comprises a handset and display unit 322, providing the user interface components of the system, but lacks the signal processing of the handset 320 of the first embodiment.

Since only a limited number of handsets are able simultaneously to communicate, it is only necessary to provide a corresponding number of low bit rate coders, channel coders, signalling units and so on (collectively referred to as a baseband processing unit) to perform the processing of the baseband signal received from and supplied to each handset 322.

Accordingly, a smaller number (e.g. n, where n is the maximum number of simultaneous calls which can be supported by the high power amplifier) of baseband processing units 324a, 324b . . . are supplied.

The IF stages of each baseband processing unit 324 are coupled to the RF stage 304 via an IF distribution network 326.

Each baseband processing unit 324 is coupled to one of n output ports of a small telephone switch 328 (e.g. a PABX unit), to the N input ports of which the user terminals 322a . . . 322q are coupled. Thus, the PABX 328 is capable of routing any user terminal 322 to any free baseband processor 324.

The PABX 328 in this embodiment is of a type which includes a call queuing process where all outgoing lines are busy.

Also provided is a store 330 commonly accessible by all the baseband processing units 324, and containing an entry for each of the user terminals 322 indicating the identity (e.g. the International Mobile Subscriber Identity or Temporary Mobile Subscriber Identity (IMSI or TMSI)) of the subscriber last registered at that user terminal.

On each occasion when an SIM 35 is inserted into the card reader 33, the identity stored thereon is transmitted to the store 330 and stored at the location for the corresponding user terminal 322; likewise when a new temporary mobile subscriber ID is received during a call by a baseband processor unit 324 it is stored in relation to the user terminal 322 via which the call is being conducted.

Figure 17:
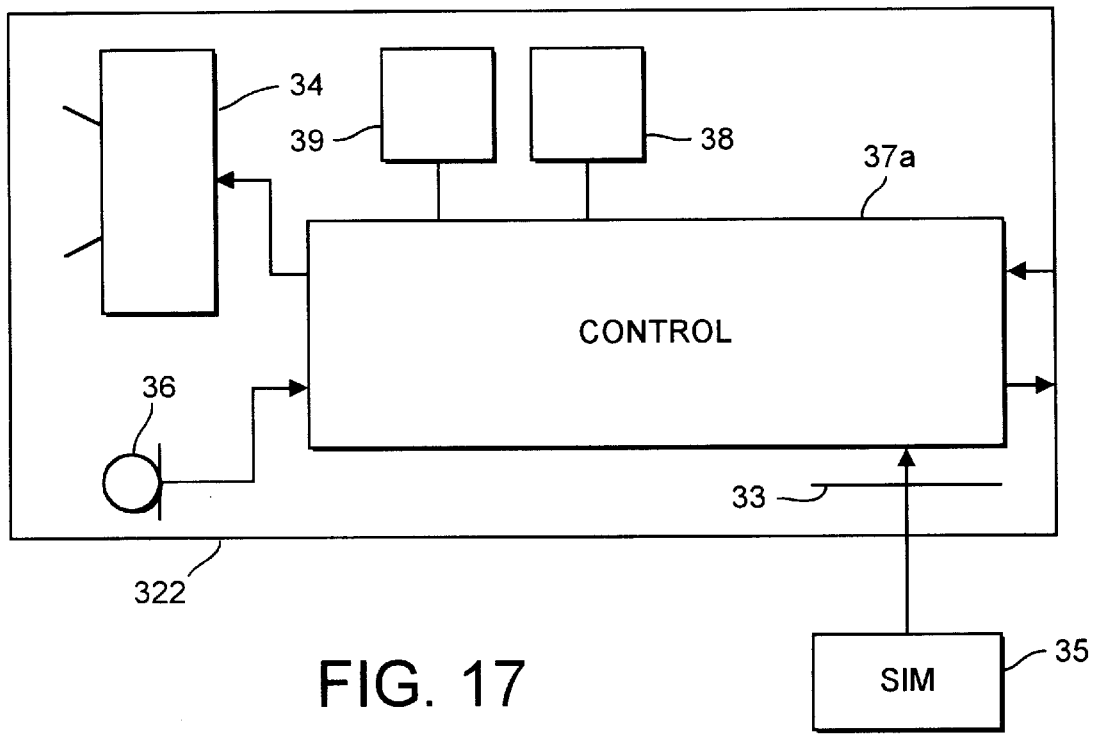
FIG. 17 is a block diagram showing schematically the structure of a user terminal of the embodiment of FIG. 16.

Referring to FIG. 17, each handset 322 therefore comprises the loudspeaker 34, microphone 36, keypad 38, display 39 and card reader 33 of a cellular handset as described in relation to FIG. 2, together with a terminal control device 37a (e.g. a micro processor). The control device 37a is arranged to respond to the card reader 33 or keypad 38 to supply tone or out of band signals to the baseband processing unit 324, and is arranged to receive tone or out of band signals therefrom and to control the display 39 in response thereto.

Figure 18:
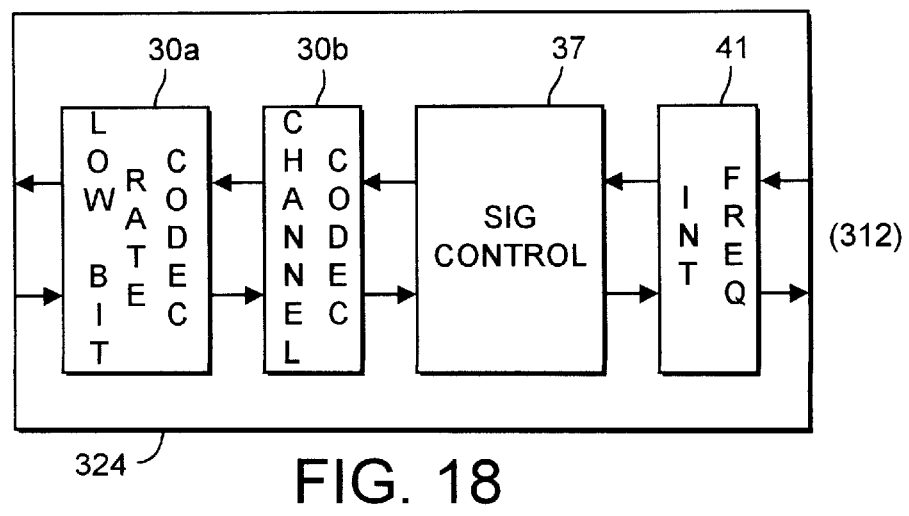
FIG. 18 is a block diagram showing schematically the structure of a baseband processing unit of the second embodiment.

Referring to FIG. 18, each baseband processing unit 324 comprises a low bit rate coder 30a and channel coder 30b, and a signalling control circuit 37b generally equivalent to the control device 37 described in the above embodiments, together with the intermediate frequency stage 41 described above. In this embodiment, the signalling control circuit 37b is arranged to communicate with the terminal control circuit 37a via tone or out of band signalling.

The operation of this embodiment will now be described in greater detail.

Outgoing Call Set Up

Figure 19A:
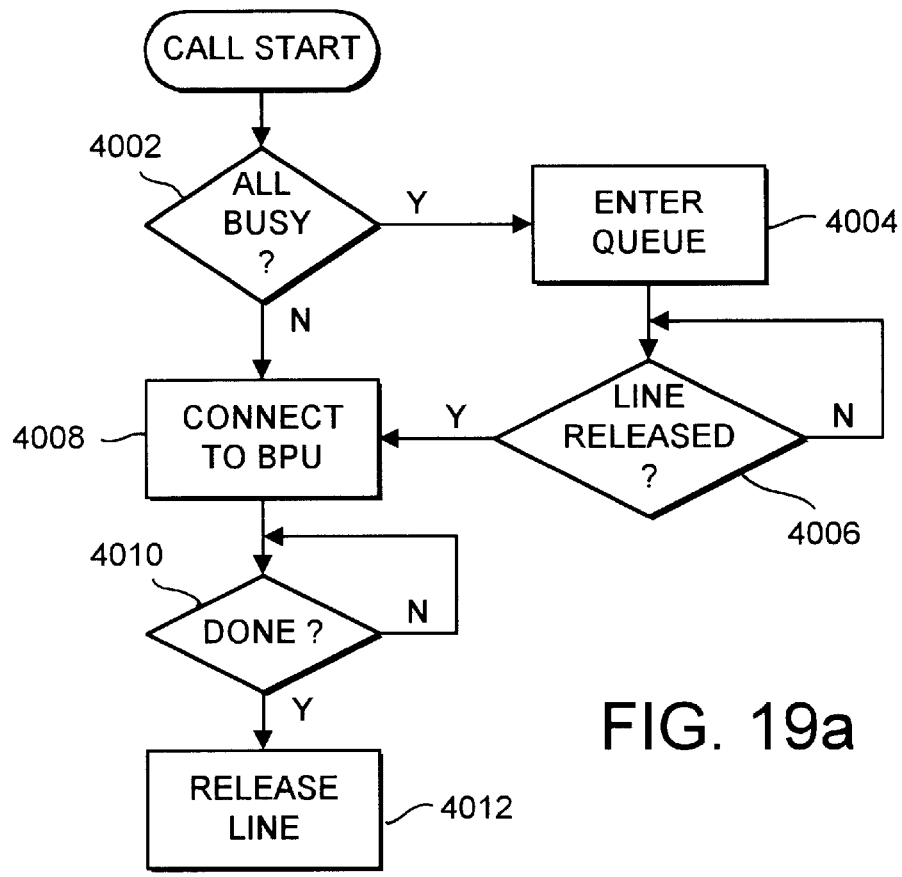
FIG. 19a is a flow diagram showing the process performed by a circuit switch forming part of the embodiment of FIG. 16 on outgoing call access.

On initiation of a call by an attempt to dial on the keypad 38, the PABX 328 determines (FIG. 19a, step 4002) whether one of its output lines to baseband processing units 324 is not busy. When all lines are busy, the user terminal 322 is entered into the PABX queuing system (step 4404) until a line is released (step 4006).

When a free line is available, the PABX 328 connects the user terminal 322 to the free baseband processing unit 324.

On determining (step 4010) that the call is complete (e.g. on hang up of the handset 322 or loss of signal via the baseband processing unit 324) the PABX releases the line (step 4012).

Figure 19B:
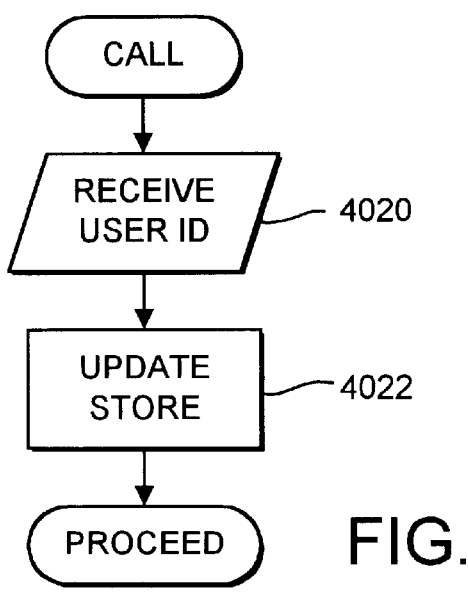
FIG. 19b is a flow diagram showing the corresponding steps performed by a baseband processing unit of FIG. 16 on outgoing call access.

Referring to FIG. 19b, on connection to a baseband processing unit, the baseband processing unit 324 is supplied with the ID (e.g. the International Mobile Subscriber Identity) of the SIM 35 from the terminal control unit 37a and, in step 4022, the baseband processor 324 accesses the store 330 and updates (if necessary) the ID record stored for the user terminal 322 from which the call originates.

The baseband processing unit 324 and handset 322 then remain in circuit connection and function exactly as the user terminals 320 of the first embodiment throughout the remainder of the outgoing call.

Incoming Call

Figure 20:
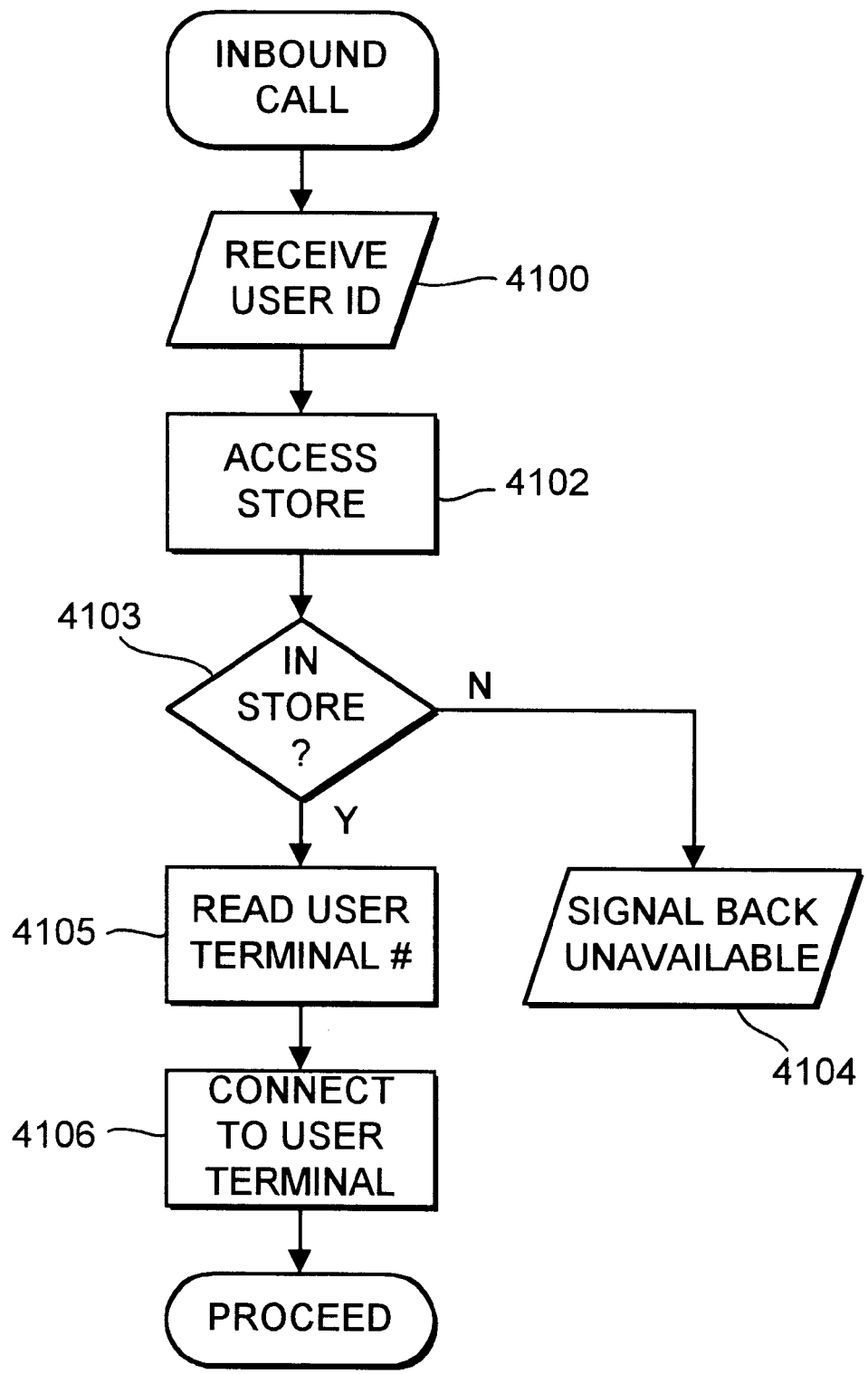
FIG. 20 is a flow diagram showing the steps performed by a baseband processing unit of FIG. 16 on an incoming call.

Referring to the FIG. 20, the process performed on an incoming call will now briefly be disclosed.

As before, if on an incoming call the RF unit 304 determines that the capacity is inadequate to support the new incoming call (in this case, because all baseband processing units 324 are busy) it signals back an indication that all lines are busy via the satellite 4 to the earth station node 6.

On the other hand, if a baseband processing unit is free, the RF stage 304 connects a free baseband processing unit 324 via the IF distribution stage 326 to allow the baseband processing unit 324 to answer the received page signal.

On receiving the ID (e.g. TMSI or IMSI) indicating the user for whom the call is intended, (step 4100), the baseband processing unit 324 accesses the store 330 (step 4102) and determines whether the required user is listed in the store 330 (step 4103). If not, then the baseband processing unit 324 signals back to indicate failure of the call.

If the user is listed in the store 330 as being present, the baseband processor 324 determines the terminal number of the user terminal 322 with which the user is listed as being registered, and (step 4106) sets up a call via the PABX 328 to that user terminal 322. The call then proceeds as in the first embodiment, with the baseband processing unit 324 and user terminal 322 being linked in a circuit connection to behave equivalently to the user terminals 320 of the first embodiment.

It will therefore be seen that this embodiment provides a more economical use of expensive signal processing components than the first.

Third Embodiment

In a third embodiment of the invention, at least some user terminals include a credit card (magnetic stripe card) reader as well as, or instead of, the SIM card reader 33, as shown in FIG. 21. The terminal contains an internal memory 35 corresponding to an SIM (and is conveniently simply a conventional SIM located so that it cannot be accessed by the user, as shown in FIG. 21).

Prior to initiating a call, the user inserts the credit card 535 into the credit card reader 500, which conducts a credit verification exercise.

A credit transaction store 502 is provided within the vehicle, connected to all of the terminal units, and the call details and credit card details are stored in the store 502 for each occasion of credit card use, for subsequent credit card billing.

When the inserted credit card is accepted, the SIM 35 within the terminal is utilised in exactly the manner described in the preceding embodiments, except that after the call is complete, the SIM 35 deregisters, since in this embodiment the apparatus is intended primarily for outgoing calls in the manner of a payphone.

Although FIG. 21 corresponds to FIG. 11 of the first embodiment, it will be apparent that the third embodiment is equally applicable to the second embodiment and the modifications to FIG. 17 will be evident. According to the third embodiment, some or all terminals may be suitable for dual use (that is, a user may insert either a smart card into a smart card reader 33 or a credit card into a credit card reader 533) but equally it is possible to implement the third embodiment by providing one or more terminals which can accept only credit cards, in the manner of a payphone. Naturally, not all terminals will operate in this manner, however.

Other Embodiments

It will be clear from the foregoing that the above described embodiment is merely one way of putting the invention into effect. Many other alternatives will be apparent to the skilled person and are within the scope of the present invention.

For example, although in the above described embodiments an electrical tree cable structure has been described, it will be clear that in other embodiments the interconnection structures could take the form of a ring, a bus or any other suitable structure.

Equally, an optical interconnection could be used; either via optical cables, or by using a free space infrared link (e.g. from the ceiling of the aircraft) to allow hands-free use of user terminals. It is also possible (but not preferred) for the terminals to communicate via RF links provided that the power levels are low and that the frequencies do not interfere with aircraft electronic systems.

Although in the above described embodiments, location updating on the basis of a single location update signal from the control device 348 has been described, it will be appreciated that location update signals could be sent by one or more the baseband processing units instead, and the present invention extends to encompass such embodiments.

Although the storage of a list of common users having the same equipment identity code at the ground station has been described, it would be possible simply to search the stored records for all users on each location update to determine those with the same equipment identity code, rather than listing them separately.

Although subscriber information modules of the kind used in the GSM system have been described above, many of the principles of the present invention may be practised with other information-carrying media.

The numbers of satellites and satellite orbits indicated are purely exemplary. Smaller numbers of geostationary satellites, or satellites in higher altitude orbits, could be used; or larger numbers of low earth orbit (LEO) satellites could be used. Equally, different numbers of satellites in intermediate orbits could be used.

Although TDMA has been mentioned as a suitable access protocol, the present invention is fully applicable to other access protocols, such as code division multiple access (CDMA) or frequency division multiple access (FDMA), or even single carrier per channel (SCPC).

Equally, whilst the principles of the present invention are envisaged above as being applied to satellite communication systems, the possibility of the extension of the invention to other communications systems (e.g. digital terrestrial cellular systems such as GSM) is not excluded.

Although, for the sake of convenience, the term "mobile" has been used in the foregoing description to denote the terminals 2, it should be understood that it is possible to practice the invention with some of the terminals 2 being completely immobile.

Instead of providing a single central database station 15 storing details of all terminal equipment 2, similar details could be stored at the home gateway 8 for all terminal equipment to register with that home gateway 8.

In the foregoing, the gateways 8 may in fact be comprised within an ISC or exchange or mobile switching centre (MSC) by providing additional operating control programmes performing the function of the gateway.

In the foregoing, dedicated ground networks lines have been described, and are preferred. However, use of PSTN or PLMN links is not excluded where, for example, leased lines are unavailable or where temporary additional capacity is required to cope with traffic conditions.

It will naturally be clear that the stores within the gateways 8 need not be physically co-located with other components thereof, provided they are connected via a signalling link.

Whilst, in the foregoing, the term "global" is used, and it is preferred that the satellite system should cover all or a substantial part of the globe, the invention extends also to similar systems with more restricted coverage (for example of one or more continents).

It will be understood that the geographical locations of the various components of the invention are not important, and that different parts of the system of the above embodiments may be provided in different national jurisdictions. For the avoidance of doubt, the present invention extends to any part or component of telecommunications apparatus or systems which contributes to the inventive concept.

The foregoing, and all other variants, embodiments, modifications or improvements to the invention are intended to be comprised within the present invention.

What is claimed is:

1. A multi user communications terminal apparatus providing simultaneous access for a plurality of users to a communications network in which the geographical locations of each user are registered and periodically updated, the terminal apparatus comprising a plurality of user terminals (320) each including electroacoustic transducers (34, 36); and a common RF unit (304) comprising a shared RF amplifier (342) for coupling to a shared antenna system (302), in which the terminal apparatus comprises a transmitter (348) for transmitting common location updating signals, and is arranged not to transmit separate location update signals for every one of said users;

further comprising a control device coupled to control the power supplied by the shared amplifier, wherein on attempted initiation of an outgoing call by a user, the apparatus is arranged to determine whether sufficient power would be available to continue communication with said network if a call were set up, and is arranged not to complete the call unless sufficient power would be available.

2. Apparatus according to claim 1, further comprising a plurality of signal processing units (324) arranged to encode and decode signals from users of said user terminals (322) prior to RF modulation thereof.

3. Apparatus according to claim 2, in which there are provided fewer said signal processing units (324) than the number of said user terminals (322), and further comprising a routing device (328) for selectively interconnecting said user terminals (322) and signal processing units (324).

4. Apparatus according to claim 1 where each said user terminal (322) comprises an input device (33) for accepting a user identification code.

5. Apparatus according to claim 4 in which the input device comprises a reader (33) for an insertable and removable electronic device (35).

6. Apparatus according to claim 4 further comprising a store (330) for storing data associating said user interface terminals (322) with the identities of the users thereof.

7. Apparatus according to claim 6 appended to claim 3 in which, on receipt of an incoming call, the routing device (328) is responsive to the store (330) to selectively interconnect the one of said user terminals (322) recorded in said store (330) as corresponding with a given user to the signal processing unit (324) receiving said incoming call.

8. Apparatus according to claim 2 in which each said user terminal (320) comprises a said signal processing unit (30).

9. Apparatus according to claim 1 in which, on initiating an outgoing call, each user terminal (320) is arranged to signal to the control device (348) and the control device (348) is arranged to response to perform said determination and to allow or deny access on the basis thereof.

10. Apparatus according to claim 1 in which said user terminals (320) are coupled to said common RF unit (304) via a distributor network (306,308,310,312) comprising a tree structure consisting of at least a first node (306) connected to a first plurality of further nodes (308) each of which is connected to a second plurality of further nodes (310).

11. Apparatus according to claim 10 in which the signal path through the distributor network (306–312) is substantially equal for all said user terminals (320).

12. Apparatus according to claim 1 in which said user terminals (320) are connected to said common RF unit (304) via cable, without RF links.

13. Apparatus according to claim 1 further comprising a positioning system (314) arranged to supply position data relating to the current position of the multi user communications terminal apparatus, the apparatus been arranged to transmit corresponding position data with said common location updating signals.

14. A vehicle including apparatus providing simultaneous access for a plurality of users each identifiable by a respective subscriber identification module to a mobile communications network in which geographical locations of each user are registered and periodically updated, the apparatus comprising a plurality of user terminals each including electroacoustic transducers and a subscriber identification module reader; and a common RF unit comprising a shared amplifier for coupling to a shared antenna system, in which the apparatus comprises a transmitter for transmitting common location updating signals, and is arranged not to transmit separate location update signals for every one of said users further comprising a control device coupled to control the power supplied by the shared amplifier, wherein on attempted initiation of an outgoing call by a user, the apparatus is arranged to determine whether sufficient power would be available to continue communication with said network if a call were set up, and is arranged not to complete the call unless sufficient power would be available.

* * * * *